United States Patent
Kunieda et al.

(10) Patent No.: US 11,218,603 B2
(45) Date of Patent: Jan. 4, 2022

(54) CONTROL METHOD INCLUDES ACQUIRING FIRST AND SECOND LAYOUT DATA GENERATED BY AN ALBUM CREATION APPLICATION IN A TERMINAL DEVICE AND UPLOADED TO A SERVER

(71) Applicant: CANON KABUSHIKI KAISHA, Tokyo (JP)

(72) Inventors: Hiroyasu Kunieda, Yokohama (JP); Shinjiro Hori, Yokohama (JP); Takayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/893,743

(22) Filed: Jun. 5, 2020

(65) Prior Publication Data
US 2020/0389562 A1    Dec. 10, 2020

(30) Foreign Application Priority Data

Jun. 7, 2019    (JP) .............................. JP2019-107504

(51) Int. Cl.
*H04N 1/00*    (2006.01)
(52) U.S. Cl.
CPC ..... *H04N 1/00196* (2013.01); *H04N 1/00145* (2013.01); *H04N 1/00167* (2013.01)
(58) Field of Classification Search
None
See application file for complete search history.

(56) References Cited

U.S. PATENT DOCUMENTS

| 10,013,395 B2 | 7/2018 | Kajiwara et al. |
| 10,290,135 B2 | 5/2019 | Mizoguchi et al. |
| 10,403,014 B2 | 9/2019 | Kunieda et al. |
| 10,740,641 B2 | 8/2020 | Iguchi et al. |
| 10,742,823 B2 | 8/2020 | Iguchi et al. |
| 2011/0285748 A1* | 11/2011 | Slatter ............... G06T 11/60 345/629 |
| 2017/0039748 A1* | 2/2017 | Kunieda ............. G06T 11/60 |
| 2018/0268520 A1 | 9/2018 | Kunieda et al. |
| 2019/0325627 A1 | 10/2019 | Kunieda et al. |
| 2019/0327367 A1 | 10/2019 | Obayashi et al. |
| 2020/0279426 A1 | 9/2020 | Yamada et al. |
| 2020/0279427 A1 | 9/2020 | Yamada et al. |
| 2020/0280640 A1 | 9/2020 | Yamada et al. |

FOREIGN PATENT DOCUMENTS

JP    2017-038343 A    2/2017

* cited by examiner

*Primary Examiner* — Lennin R RodriguezGonzalez
(74) *Attorney, Agent, or Firm* — Venable LLP

(57) ABSTRACT

A control method includes acquiring first layout data and second layout data generated by an album creation application in a terminal device of a user and uploaded to a server, outputting an estimated feature value based on the acquired first layout data, generating an album creation parameter based on the output estimated feature value, generating layout data based on the generated album creation parameter and an image used for the acquired second layout data, and updating the album creation parameter based on a feature value based on the generated layout data and a feature value based on the second layout data.

11 Claims, 17 Drawing Sheets

FIG.16A

| User-SPECIFIC INFORMATION | ALBUM-SPECIFIC INFORMATION |
|---|---|

FIG.16B

User-SPECIFIC INFORMATION

| Group ID | User ID | Sex | Age | Address | Telephone number | E-mail address | ... |
|---|---|---|---|---|---|---|---|

ALBUM-SPECIFIC INFORMATION

| ALBUM ENTIRE INFORMATION | WITHIN-DOUBLE-PAGE-SPREAD INFORMATION |
|---|---|

FIG.16C

ALBUM ENTIRE INFORMATION

| Album ID | Commodity material size | Type of book-binding | Media | Number of image slots | Slot size ratio | Composition pattern | Number of double-page spreads | Unit price | Campaign | ... | Average margin amount | Average number of image slots | Average slot size ratio | Entire composition pattern | Object weight | Editing operation log |
|---|---|---|---|---|---|---|---|---|---|---|---|---|---|---|---|---|

WITHIN-DOUBLE-PAGE-SPREAD INFORMATION

| Double-page spread number(1) | Margin amount | Number of image slots | Slot size ratio | Composition pattern | Editing operation log | ... | Double-page spread number(2) | ... | Double-page spread number(n) |
|---|---|---|---|---|---|---|---|---|---|

CONTROL METHOD INCLUDES ACQUIRING FIRST AND SECOND LAYOUT DATA GENERATED BY AN ALBUM CREATION APPLICATION IN A TERMINAL DEVICE AND UPLOADED TO A SERVER

This application claims the benefit of Japanese Patent Application No. 2019-107504, filed Jun. 7, 2019, which is hereby incorporated by reference herein in its entirety.

BACKGROUND OF THE INVENTION

Field of the Disclosure

The present disclosure relates to a technique to create a photo album.

Description of the Related Art

Japanese Patent Laid-Open No. 2017-038343 discloses software for creating a photo album by selecting photos that are used in the album from among a plurality of photos and automatically laying out the selected photos. The function such as this to automatically select photos and layout the photos in an album is called an automatic layout function. The automatic layout function analyzes a plurality of photos, gives a score to each photo by analyzing the photo, and preferentially adopts a photo whose score is high for the layout of an album.

SUMMARY OF THE DISCLOSURE

The degree of satisfaction for a photo album created by the automatic layout is related not to only the image quality, but also, the personal preference of a user. Consequently, an object of the present disclosure is to make it possible to present a layout more reflecting the preference of a user.

One embodiment of the present disclosure is a control method including outputting an estimated feature value based on first layout data generated by a user, generating an album creation parameter based on the output estimated feature value, generating layout data based on the generated album creation parameter and an image used for second layout data generated by a user, and updating the album creation parameter based on a feature value based on the generated layout data and a feature value based on the second layout data.

Further features of the present disclosure will become apparent from the following description of exemplary embodiments with reference to the attached drawings.

BRIEF DESCRIPTION OF THE DRAWINGS

FIG. 16A to FIG. 16C are each a diagram showing a data structure of an album creation parameter.

DESCRIPTION OF THE EMBODIMENTS

First Embodiment

<About Configuration of System>

Figure 1A:
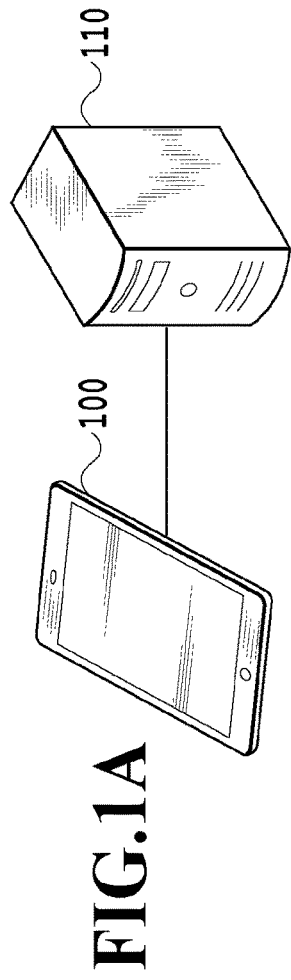
FIG. 1A to FIG. 1C are diagrams showing a system configuration of an album creation service.

In the following, the configuration of an album creation system in the present embodiment is explained by using FIG. 1A to FIG. 1C. FIG. 1A is a diagram showing the entire configuration of the album creation system in the present embodiment. As shown in FIG. 1A, this system has a user terminal 100 and a cloud server 110 connected to the user terminal 100 and it is possible to perform transmission or reception of data between the user terminal 100 and the cloud server 110. As the user terminal 100, a tablet, a smartphone, an information processing apparatus (hereafter, PC), or the like, is supposed.

Figure 1C:
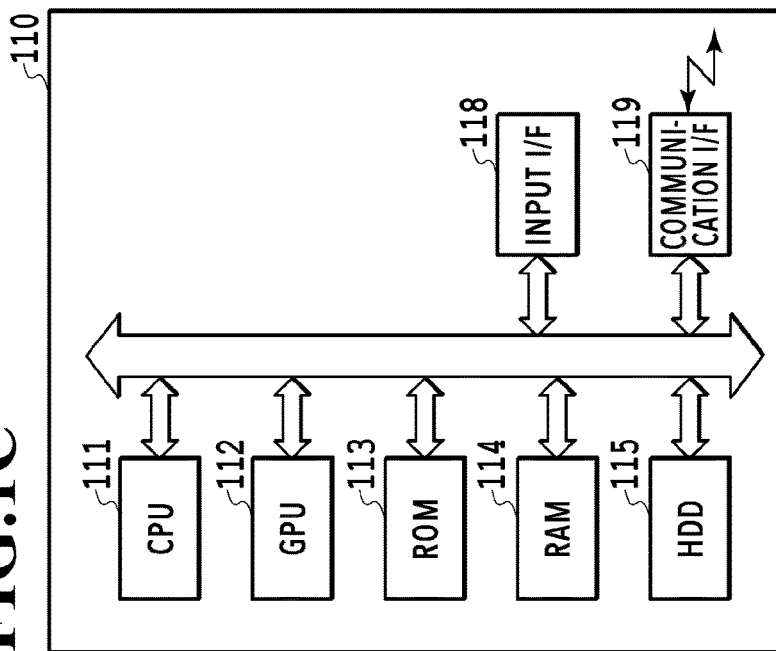
Figure 1B:
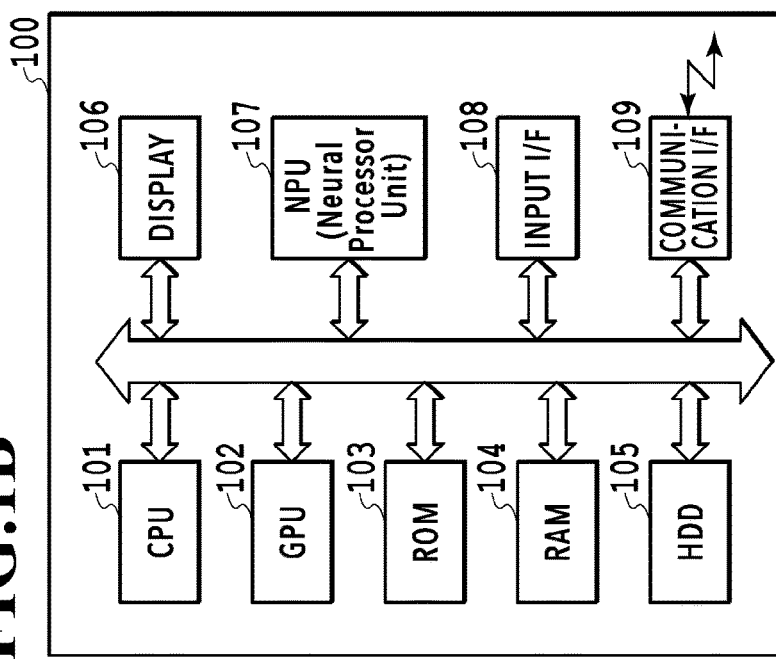

FIG. 1B is a block diagram showing the hardware configuration of the user terminal 100 functioning as an image processing apparatus. A CPU 101 centralizedly controls the operation of the user terminal 100 by loading control programs stored in a ROM 103 onto a RAM 104 and performs various kinds of control, such as image processing control, by reading the control programs as needed.

A GPU 102 controls the display of a display 106 by performing calculation processing that is necessary at the time of performing image drawing. In recent years, there is a case when the GPU is used as an accelerator of artificial intelligence processing that requires a high-load parallel calculation.

In the ROM 103, various programs, such as an activation program of the user terminal 100, are stored. In the present embodiment, as the ROM 103, a flash storage, or the like, is supposed. The RAM 104 is a main storage device of the CPU 101 and used as a work area or a temporary storage area for loading various programs stored in the ROM 103.

A hard disk drive (hereafter, HDD) 105 is a large-capacity storage device. In the HDD 105, application programs, such as an album creation application, image data, and the like, are saved.

On the display 106, application processing results (for example, double-page spread of an album and the like) are displayed.

A neural processing unit (hereafter, NPU) 107 is an artificial intelligence dedicated chip incorporating a neural network that simulates the human cerebral nerve system. By incorporating the NPU 107 in the user terminal 100, it is made possible for the terminal alone to perform image recognition and natural language processing using the machine learning (for example, deep learning), which are conventionally performed on the basis of a cloud.

To an input I/F 108, an input device, such as a keyboard and a mouse, is connected (not shown schematically). The input I/F 108 receives user instructions from the input device such as this and transmits input data to each module of an application implemented by the CPU 101.

A communication I/F 109 has a USB I/F and a network I/F and the user terminal 100 is connected with the external cloud server 110 via the communication I/F 109.

FIG. 1C a block diagram showing the hardware configuration of the cloud server 110. The basic configuration of the cloud server 110 that functions as an image processing apparatus is the same as that of the user terminal 100. However, in general, the performance of the CPU, the GPU, and the communication I/F of the cloud server is higher than that of the CPU, the GPU, and the communication I/F of the user terminal and the capacity of the HDD, the ROM, and the RAM of the cloud server is greater than that of the HDD, the ROM, and the RAM of the user terminal. Here, the configuration is described in which the cloud server 110 has neither a display nor an NPU, but it may also be possible for the cloud server 110 to have a display and an NPU.

<About Album Creation>

Figure 2:
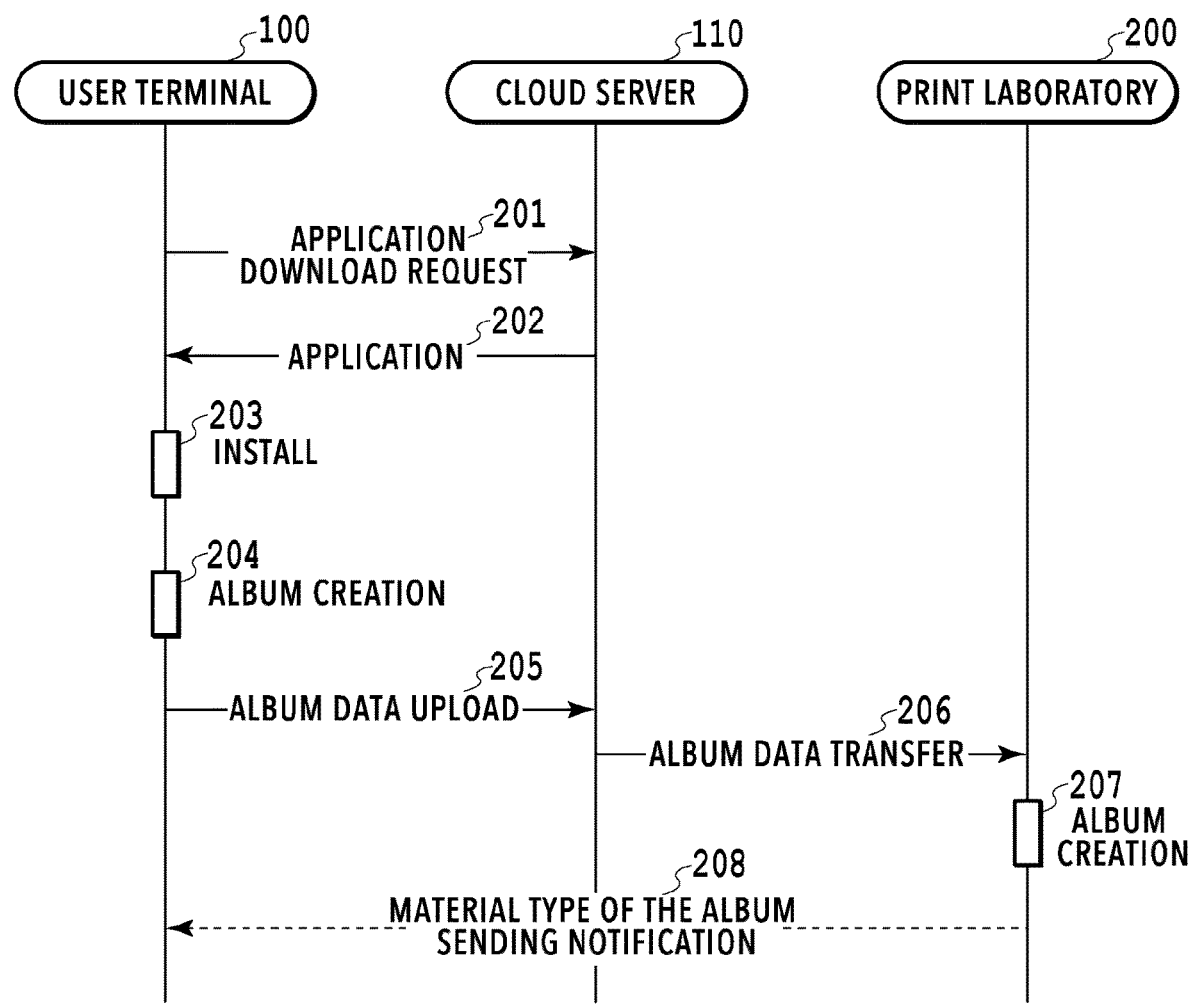
FIG. 2 is a sequence diagram relating to album creation.

In the following, album creation in the present embodiment is explained by using FIG. 2. FIG. 2 is a sequence diagram showing a general flow of album creation in the present embodiment and shows an example of an album creation service that is provided by the user terminal 100, the cloud server 110, and a print laboratory 200.

A user boots an album creation application (hereafter, simply described as application) on the user terminal 100 and gives instructions to create an album in a predetermined format by using captured and collected photos via a UI of the application. In FIG. 1A and FIG. 2, an aspect is shown in which the album creation system has one user terminal, but the number of user terminals connected to the album creation system may be two or more and, in this case, the cloud server is connected with the user terminals of a plurality of users.

Figure 3:
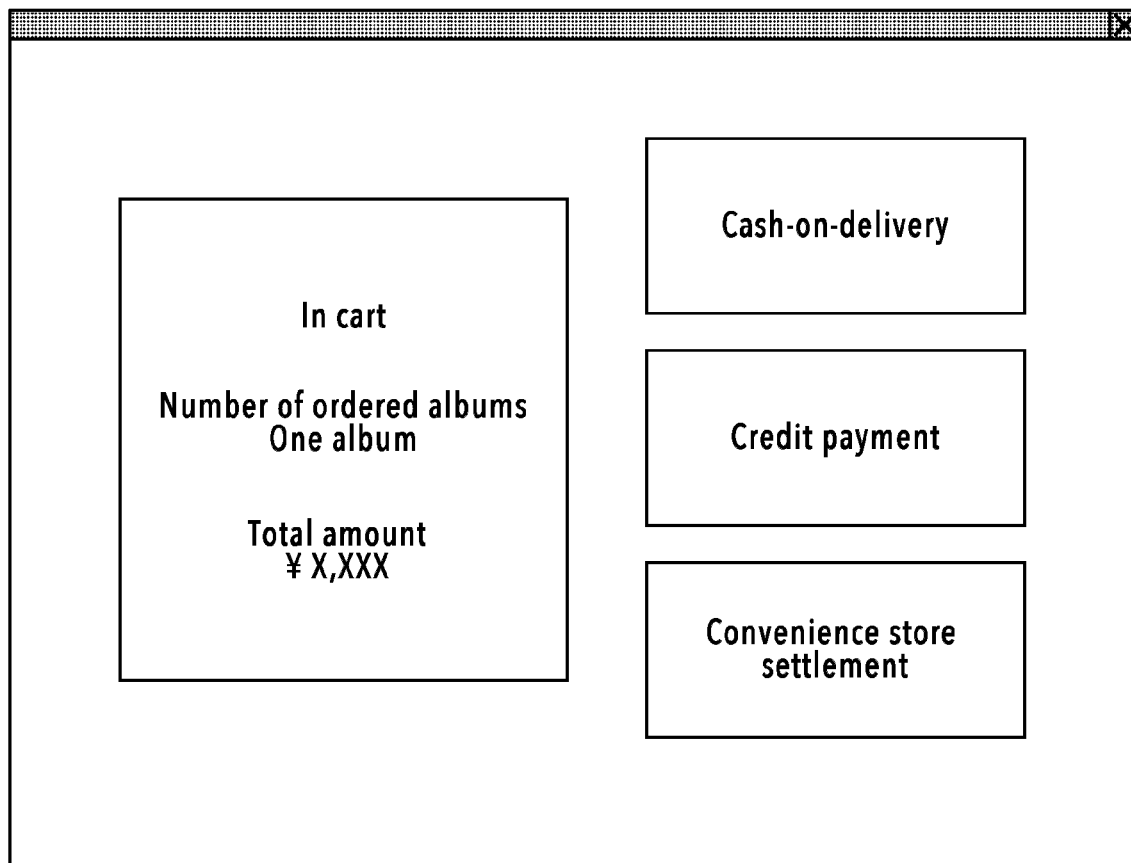
FIG. 3 is a diagram showing a settlement UI screen.

The cloud server 110 is connected with the user terminal 100 and a PC of the print laboratory 200 via a network. The installer of the application is stored in the cloud server 110 and a user downloads the installer as needed. In a case when album data created via the application is uploaded to the cloud server 110, the cloud server 110 temporarily saves the album data. Further, the user performs so-called billing processing, such as fee payment processing, via a settlement UI screen (see FIG. 3) on the application. The cloud server 110 transfers the album data for which the proceedings to request for album creation, such as billing processing, have been completed to the PC of the print laboratory 200.

The print laboratory 200 comprises a PC (see FIG. 1B) whose configuration is the same as that of the user terminal 100 and a printing apparatus. The PC of the print laboratory 200 receives the album data for which the proceedings to request for album creation including billing processing have been completed from the cloud server 110. In the print laboratory 200, album creation based on the album data, specifically, printing and bookbinding are performed. A created album is sent to a user. The PC of the print laboratory 200 notifies the user terminal 100 of sending of the album.

The procedure of the actual album creation is as follows. In a case when the application is not installed in the user terminal 100 at the time of a user desiring to create an album, the user makes an attempt to download the application from a WEB site, or the like, of a company that provides the album creation service by operating the user terminal 100. At this time, as indicated by symbol 201, the user terminal 100 transmits a download request for the application to the cloud server 110.

The cloud server 110 having received the download request transmitted by the user terminal 100 transmits the installer of the application to the user terminal 100 as indicated by symbol 202. In the user terminal 100 having received the installer transmitted by the cloud server 110, the installation of the application is performed as indicated by symbol 203. By the installation of the application, it is made possible for s user to create an album by using the user terminal 100.

As indicated by symbol 204, a user activates the application installed in the user terminal 100 and creates an album on the application. The application has a function (automatic layout function) to automatically create an album by selecting photo images and arranging the selected photo images on a double-page spread. It may also be possible for a user to automatically or manually edit the album created by making use of the automatic layout function on the application. Further, the application also has a function to upload the album data created via this to the cloud server 110.

As indicated by symbol 205, the user terminal 100 uploads the album data created by using the application to the cloud server 110. Further, although not shown in FIG. 2, the user terminal 100 also performs processing relating to the ordering of an album, such as billing processing, as well as uploading of the album data to the cloud server 110.

The album data that is uploaded to the cloud server 110 may not be the album data itself (double-page spread data in which images are arranged in templates) generated in the user terminal 100. For example, the template data used in the album data may not be included. That is, the album data may data not including the template data but including identification information identifying templates, arranged image data, and information relating to the arrangement position. In this case, in the cloud server 110 or the print laboratory 200, the layout is performed again based on the identification information identifying the template data and the information relating to the arrangement position, and thereby, the album data is generated.

In a case of receiving the completion notification of the album ordering processing, the cloud server 110 determines that an album has been ordered and as indicated by symbol 206, transfers the album data received from the user terminal 100 to the PC of the print laboratory 200.

As indicated by symbol 207, in the print laboratory 200, album creation based on the album data transferred to the PC (specifically, printing using a printing machine, bookbinding using a bookbinding machine) is performed.

A material type of the album (bookbinding-completed product) created in the print laboratory 200 is sent to a user from the print laboratory 200. Further, as indicated by symbol 208, the PC of the print laboratory 200 transmits a sending notification of the material type of the album to the cloud server 110. This sending notification is also transmitted to the cloud server 110 and in the cloud server 110 having received the sending notification, the album order management based on the contents of the sending notification is performed.

In FIG. 2, the case is shown when the application is not installed in the user terminal 100 and the installer of the application is downloaded, but the present embodiment is not limited to this case. For example, it is also possible to apply the present embodiment to a case when the application is already installed in the user terminal 100 (but, not the latest version) and the application of the latest version is downloaded.

<About Learning of Automatic Layout Control>

Figure 4:
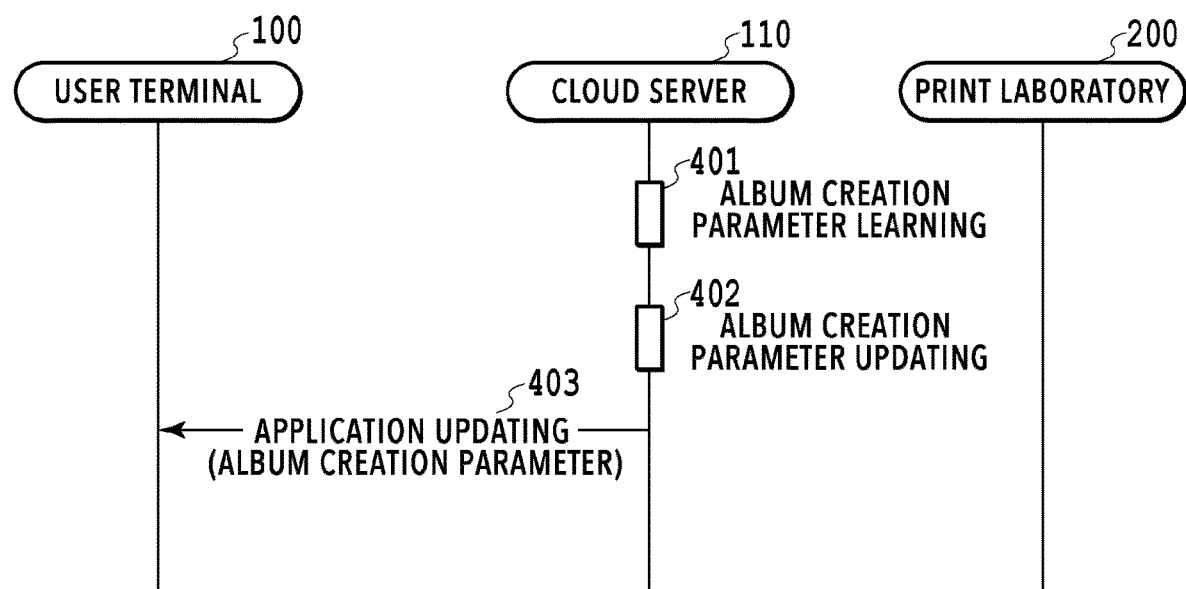
FIG. 4 is a sequence diagram relating to learning of automatic layout control.

In the following, the learning of the automatic layout control in the present embodiment is explained by using FIG. 4. FIG. 4 shows a case when the learning of the automatic layout control is performed in the cloud server 110, but the learning of the automatic layout control may be performed in the PC of the print laboratory 200. Further, the learning of the automatic layout control may be performed on the user terminal 100.

In a case of receiving album ordering instructions from a user, as indicated by symbol 401, the cloud server 110 starts the learning for the automatic layout control. The learning for the automatic layout control refers to analyzing the preference and tendency of a user by using album data indicating the contents of the album ordered by a user, and the like. More specifically, the learning for the automatic layout control refers to deriving each value of the parameter (referred to as album creation parameter) necessary at the time of automatic layout processing. The learning for the automatic layout control and the album creation parameter will be described later.

As indicated by symbol 402, in accordance with learning results of the automatic layout control, the cloud server 110 updates the album creation parameter by the value derived by the learning described previously.

As indicated by symbol 403, at the time of updating of the application explained in FIG. 2, the updating results of the album creation parameter are reflected. Due to this, at the time of a user activating the application next time on the user terminal 100, each value of the updated album creation parameter is loaded. Consequently, it is made possible to perform the automatic layout processing based on the updated album creation parameter in the user terminal 100.

<About Album Creation Processing in User Terminal>

In the following, the album creation processing (204 in FIG. 2) performed in the user terminal 100 in the present embodiment is explained by using FIG. 5.

At step S501, the updating of the application is performed. In a case when the application is activated in the user terminal 100, the user terminal 100 accesses the predetermined cloud server 110. At this time, in a case when the latest version of the application that is not installed yet in the user terminal 100 exists, the user terminal 100 transmits a download request for the latest version to the cloud server 110 and receives the latest version as a response to this request. After that, in the user terminal 100, the updating of the application by the installation of the received latest version is performed. At the time of the updating of the application, the user terminal 100 also acquires the latest version of the parameter necessary for album creation. In the following, "step S-" is simply described as "S-".

Figure 6:
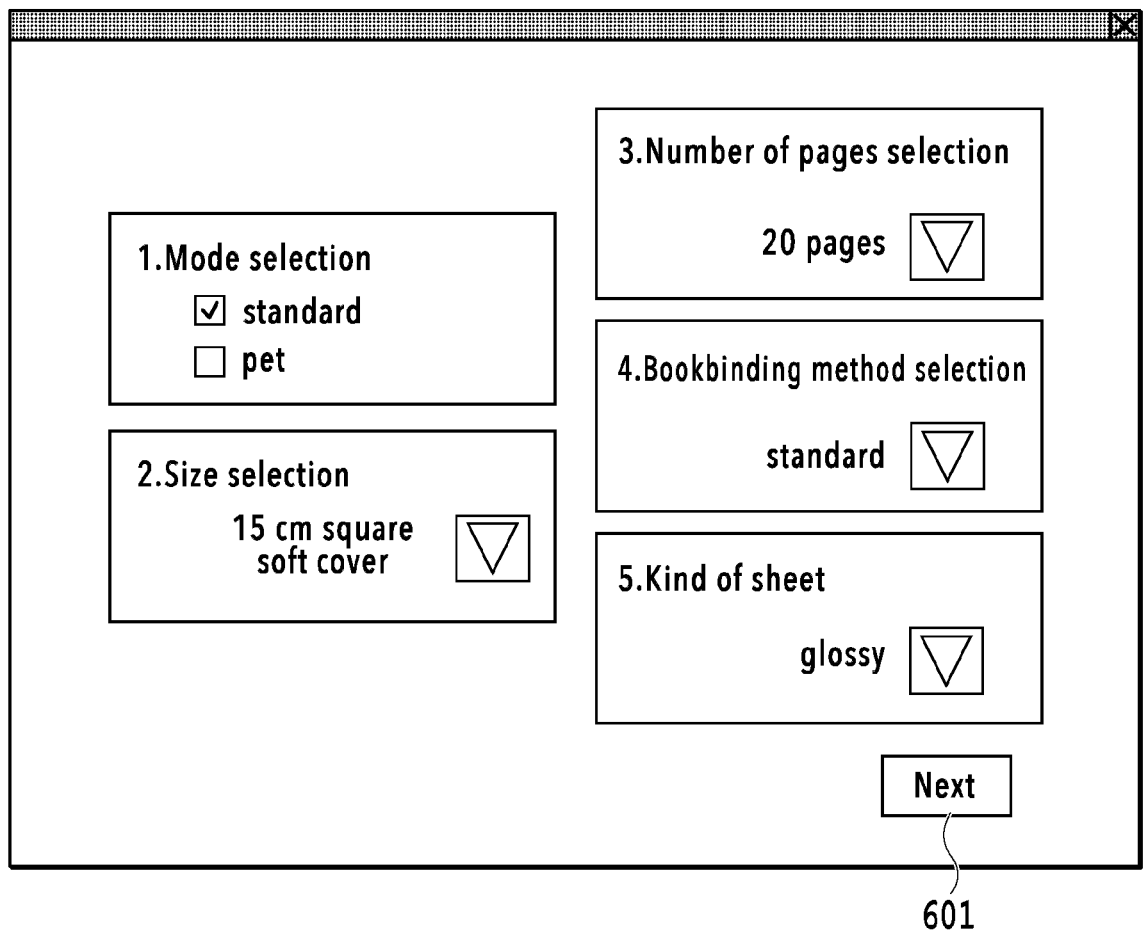
FIG. 6 is a diagram showing a setting UI screen.

In a case when the application is activated and the application and the album creation parameter are updated at S501, the processing advances to S502. At S502, a setting UI screen as illustrated in FIG. 6 is displayed. A user selectively determines specifications of the album that is ordered, such as the size of the album, the type of paper, the number of pages, and the bookbinding method, via the setting UI screen. In a case when the user determines the specifications of the album and presses down a "Next" button 601, the processing advances to image selection at S503.

At S503, as a UI of the application, a screen for selecting photo images to be used in the album (referred to as image selection UI screen) is displayed. A user selects images to be used in the album via the image selection UI screen. In a case when images are selected by the user, the processing advances to S504.

Figure 7:
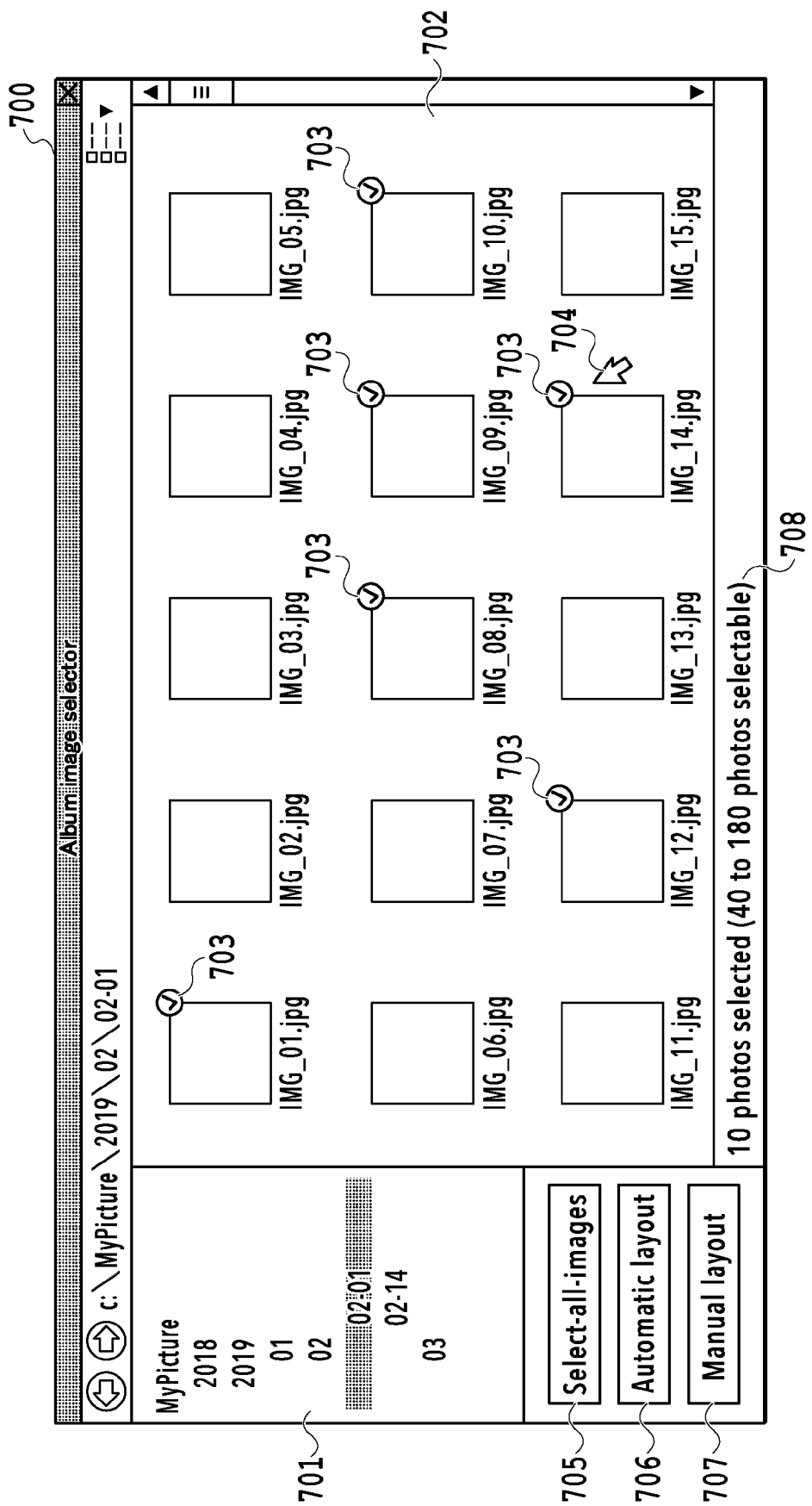
FIG. 7 is a diagram showing an image selection UI screen.

Here, the image selection UI screen is explained by using FIG. 7. FIG. 7 shows an example of the image selection UI screen. An image selection window 700 has a folder display area 701 and a selection area 702.

The folder display area 701 is an area for displaying the folder structure within the HDD 105. In the folder display area 701, image folders are displayed in a hierarchical manner. In a case when the image selection UI screen is displayed, first, a user selects a desired folder. The example in FIG. 7 shows the state where a folder whose name is "02-01" is selected as a folder desired by the user and in this folder, images of photos captured Feb. 1, 2019 are saved.

The selection area 702 is an area for a user to select photos to be used in the album and in which a thumbnail image of each photo saved in the specified folder is displayed. In the example in FIG. 7, to the thumbnail image of the photo selected by the user, an icon 703 indicating that the thumbnail image is already selected (hereafter, referred to as already-selected icon) is attached.

A pointer 704 is controlled by an input device, such as a mouse. It is possible for a user to select the function in the application and to control execution thereof by moving the pointer 704.

A Select-all-images button 705 is a button for selecting all the images within the specified folder. In a case when a user presses down the Select-all-images button 705, the state is brought about where all the images within the specified folder are selected (that is, the already-selected icon 703 is attached). In a case when the user presses down the Select-all-images button 705 again in this state, the selection of all the images is cancelled.

An Automatic layout button 706 is a button for performing the automatic layout processing. In a case when a user presses down the Automatic layout button 706, the images selected by the user or a plurality of images included within the specified folder is analyzed for the layout and the automatic layout processing to automatically arrange at least a part of the analyzed images is performed.

A Manual layout button 707 is a button for a user to perform the layout manually. Some users desire to perform the layout by themselves in place of performing the automatic layout processing. In a case when the Manual layout button 707 is pressed down, the automatic layout processing is not performed. In this case, the mode is such that a user arranges the images selected by the user him/herself via a GUI. As described above, it is possible for a user to select the layout creation method by pressing down either the Automatic layout button 706 or the Manual layout button 707.

In the image selection window 700, a message 708 for notifying a user of the number of photos selected by the user and the number of photos that can be selected is also displayed.

Figure 5:
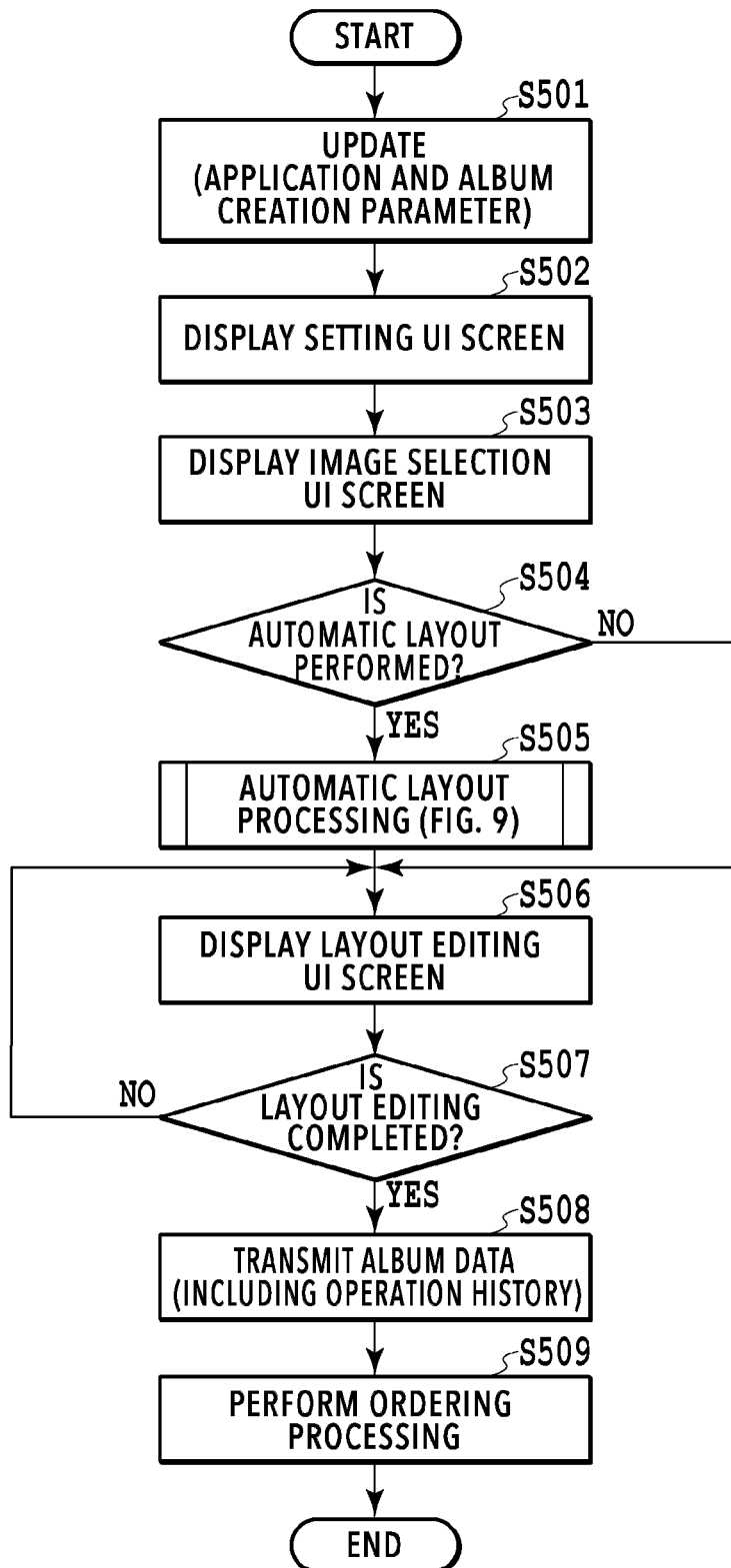
FIG. 5 is a flowchart of processing of album data creation and album ordering at a user terminal.

Returning to the explanation of FIG. 5. At S504, whether or not to perform the automatic layout processing is determined. Specifically, which of the Automatic layout button 706 and the Manual layout button 707 is pressed down is determined. In a case where when it is determined that the Automatic layout button 706 is pressed down, the processing advances to S505 and on the other hand, in a case when it is determined that the Manual layout button 707 is pressed down, the processing advances to S506.

At S505, the automatic layout processing is performed. The "automatic layout processing" is processing to automatically arrange the images selected automatically or selected manually by a user on a double-page spread based on the preference and tendency of the user. The automatic layout processing will be described later.

At S506, as a UI of the application, a screen for editing the layout of the album (referred to as layout editing UI screen) is displayed. It is possible for a user to edit the layout via the layout editing UI screen. The user terminal 100 receives a user input via the layout editing UI screen.

Figure 8:
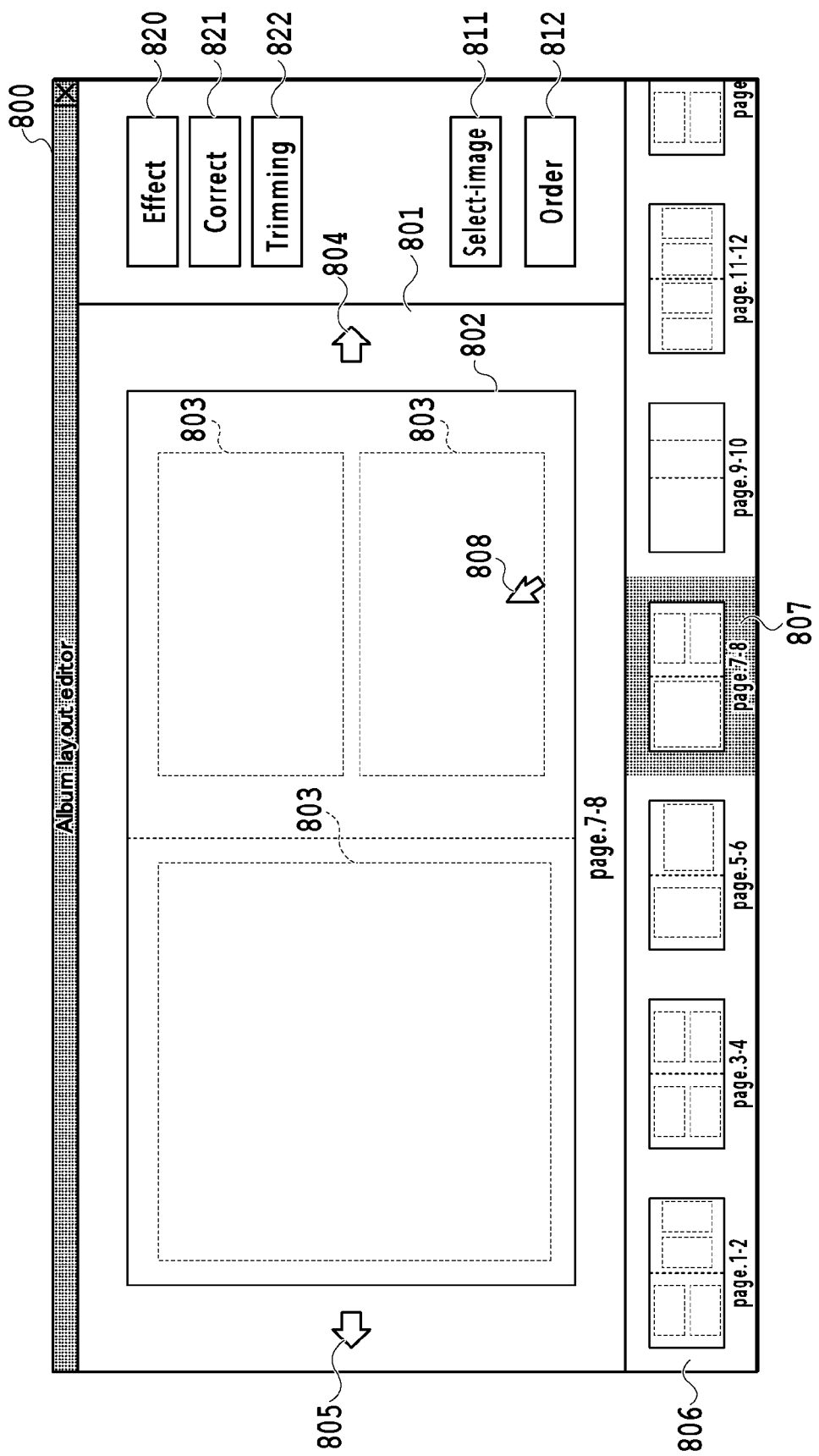
FIG. 8 is a diagram showing a layout editing UI screen.

Here, the layout editing UI screen is explained by using FIG. 8. FIG. 8 shows an example of the layout editing UI screen. An editing window 800 has a display area 801 in which an editing screen of a double-page spread currently being selected is displayed and a selection area 806 for selecting an editing-target double-page spread.

In the display area 801, a preview 802 of the double-page spread currently being edited is displayed. The preview 802 shows results of the layout created in a case when images 803 scheduled to be used are arranged.

Buttons 804 and 805 are buttons for changing the double-page spread that is displayed in the display area 801. It is possible for a user to change the double-page spread that is displayed in the display area 801 to the next double-page spread (in detail, the double-page spread whose page numbers are just after those of the double-page spread currently being displayed) by pressing down the button 804. In contrast to this, it is possible for a user to change the double-page spread that is displayed in the display area 801 to the previous double-page spread (in detail, the double-page spread whose page numbers are just before those of the double-page spread currently being displayed) by pressing down the button 805.

In the selection area 806, as the thumbnail image of each of the plurality of double-page spreads configuring the album, the thumbnail images of the double-page spread currently being displayed in the display area 801 (that is, the double-page spread currently being selected) and the other double-page spreads are displayed. In the example in FIG. 8, as indicated by symbol 807, the double-page spread of pages 7 and 8 is selected.

In a case when a user presses down an Effect button 820, effect processing is performed for the image arranged in the slot selected by the user on the layout currently being edited. As the effect processing at the time of the pressing down of the Effect button 820, predetermined processing may be performed, or it may also be possible to enable the user to open another GUI and set the kind of effect via the GUI.

In a case when a user presses down a Correct button 821, correction is performed for the image arranged in the slot selected by the user on the layout currently being edited. Here, it is assumed that automatic photo correction is performed as the predetermined processing at the time of the pressing down of the Correct button 821. However, an aspect may be accepted in which it is possible for the user to open another GUI and set the kind of correction via the GUI.

In a case when a user presses down a Trimming button 822, trimming processing is performed for the image arranged in the slot selected by the user on the layout currently being edited. In the trimming processing, a main object area is specified based on the image analysis information and then trimming is performed so that the main object area becomes the maximum in the range in which the size of the main object area is included in the slot.

A Select-image button 811 is a button for returning to the image selection again. In a case when a user presses down the Select-image button 811, the image selection window 700 is displayed along with the editing window 800 or in place of the editing window 800. An Order button 812 is a button for terminating the editing work of the album and advancing to the next ordering work. In a case when the Order button 812 is pressed down, the album data and editing history data are transmitted from the user terminal 100 to the cloud server 110. The editing history data is used for learning in the cloud server 110. For example, in a case when the amount of the editing history after the automatic layout processing is small, it is possible to regard that the preference of a user is reflected correctly in the album creation parameter used at the time of the automatic layout processing.

A pointer 808 is controlled by an input device, such as a mouse. It is possible for a user to perform various kinds of editing work by using the pointer 808. For example, in a case when the image 803 the user desires to move exists, it is possible for the user to select one or a plurality of movement-target images and to move the image(s) leftward, rightward, upward, or downward to a desired position by dragging and dropping them with the pointer 808. Further, for example, in a case when the image the user desires to correct exists, it is only required for the user to select the target image by using the pointer 808 and press down the Correct button 821. By pressing down the Correct button 821, the correction processing for the target image is performed. An aspect may be accepted in which it is possible for the user to select and to control image sharpening, brightness correction, saturation correction, and the like, via another window that is displayed by pressing down the Correction button 821.

In a case when a user desires to add a new image, it is possible to add an image in the preview 802 currently being selected by displaying the image selection window 700 again by pressing down the Select-image button 811, and selecting the image and pressing down the Manual layout button 707. As editing items other than the editing items described previously, changing of the template to be used, selection of the background color, setting of the background pattern, adjustment of the amount of margin, and the like are considered.

As described above, via the layout editing UI screen that is displayed at S506, the layout editing in accordance with the preference of a user is performed. By acquiring the operation log at this time and using the log for the learning of the album creation parameter (to be explained later in detail), it is made possible to automatically create an album in accordance with the preference and tendency of a user.

At S507, whether the layout editing is completed, specifically, whether the Order button 812 is pressed down is determined. In the present embodiment, each time the contents relating to one editing item are determined, whether the editing is completed is determined at S507. In a case when the determination results at S507 are affirmative, the processing advances to S508. On the other hand, in a case when the determination results at S507 are negative (that is, in a case where new editing instructions are given), the processing returns to S506 and the layout editing is continued.

At S508, the created album data is transmitted to the cloud server 110. In a case when the album data is transmitted to the cloud server 110 at this step, the operation history data on a user in the application is also transmitted.

At S509, the album ordering processing is performed. The album ordering processing includes transmission of the album fee payment completion notification to the cloud server 110, reception of the album sending destination data that is input by a user, and transmission to the cloud server 110. In a case when all the pieces of processing relating to the album ordering in the user terminal 100 are completed, the cloud server 110 transfers the album data transmitted from the user terminal 100 at S508 to the PC of the print laboratory 200.

<About Automatic Layout Processing>

Figure 9:
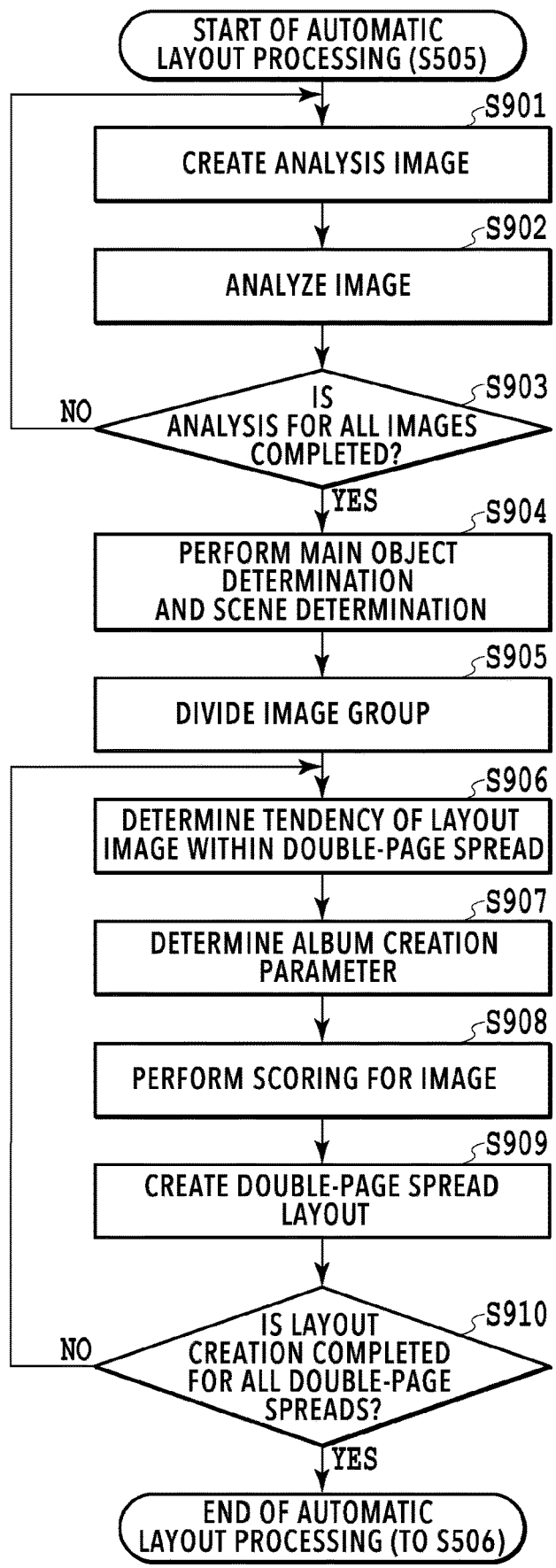
FIG. 9 is a flowchart of automatic layout processing.

In the following, the automatic layout processing (S505 in FIG. 5) is explained by using FIG. 9. FIG. 9 is a flowchart for explaining details of the automatic layout processing performed in the user terminal 100. Here, a case is explained as an example where a layout is created by automatically selecting images used for the album from an image group included within a folder specified by a user and automatically arranging the selected images on a double-page spread.

At S901, an analysis image is created by acquiring an image within a folder specified by a user via the image selection UI screen and performing re-size processing for the acquired image.

At S902, the acquired album creation parameter is set and based on the set album creation parameter, the image analysis for the analysis image created at S901 is performed. For example, by the analysis at this step, the information on the image capturing date for each image is acquired and as a result, it is made possible to calculate the difference in the image capturing time between adjacent images. The item that is analyzed at this step is determined in advance, but it may also be possible to change the analysis item or the analysis condition in accordance with the setting of the album creation parameter.

At S903, whether all the images within the specified folder are analyzed is determined. In a case when the determination results at this step are affirmative, the processing advances to S904. On the other hand, in a case when the determination results at this step are negative, the processing returns to S901 in order to perform the image analysis for the image not analyzed yet.

At S904, by using the analysis results at S902, the main object determination and the scene determination are performed. Here, the number of images in which a specific object is included is counted for each object and the specific object whose count value is the greatest is determined to be the main object. As the specific object, for example, person, child, baby, dog, cat, flower, dish, or the like, is considered. For the object determination, it is possible to use a conventional determination method, such as the method described in Japanese Patent Laid-Open No. 2017-038343.

In the scene determination, by using the analysis results at S902, which of the predetermined scenes the scene of an image is classified into is determined. In the present embodiment, wedding, journey, and others are taken as the three predetermined scenes and for each scene, the distribution of the number of shots and the distribution of the number of faces are set in advance. The scene of an image is determined by determining which of the distributions of these three scenes the distributions of the scene of the image most resemble. For the scene determination, it may also be possible to use a conventional determination method, such as the method described in Japanese Patent Laid-Open No. 2017-038343.

At S905, the image group within the specified folder is divided into sub image groups. The division at this step is performed so that the portion at which the difference in the image capturing time between adjacent images is large is the boundary and performed repeatedly until the number of sub image groups and the number of double-page spreads of the album become the same.

The processing at S906 to S910 is performed for each double-page spread.

At S906, the tendency of the layout image within the double-page spread is determined. Here, explanation is given by taking a case as an example where the tendency is determined in accordance with the main object. The main object determined at S904 and the main object within the setting of the album creation parameter are compared. In a case when the results of the comparison indicate that both are different, priority is given to the main object determined at S904 as the object that is caused to appear in the results of the layout to be created from now. As an example, a case is considered when the setting is performed within the album creation parameter so that a person is given a score higher than that given to a pet (for example, dog or cat), but, on the other hand, the number of images of the pet is greater than the number of images of the person in the specified folder. In the case such as this, the setting of the album creation parameter is cancelled and the setting is changed so that the images of the object (in this example, images of pet) included more in the specified folder are given a high score. In the first ordering with no ordering history, it is recommended to use the default parameter setting. Then, in a case when the tendency of the layout image within the double-page spread is different from that of the default parameter, the setting is changed so that the images of the object included more in the specified folder are given a high score. Here, for explanation, the method of performing control so that the main object is given a high score is described, but it may also be possible to manage whether an object is included for each manage by attaching a flag and select the image to be used based on the flag.

At S907, the album creation parameter is determined selectively. Specifically, the album creation parameter for each scene is stored in advance in the user terminal 100 and in accordance with the results of the scene determination at S704, the album creation parameter is determined. Alternatively, it may also be possible to determine the album creation parameter in accordance with the results of the main object determination at S704 by storing in advance the album creation parameter for each main object in the user terminal 100.

At S908, scoring for the image is performed. At this step, based on the feature value derived by the analysis at S902, the score is calculated for each image. At the time of score calculation, by changing the weight of the feature value in accordance with the determined scene, the control is performed so that the score is different for each scene. For example, in a case when it is determined that the scene of the image is journey, the setting is performed so that the image whose face size is small is given a score high compared to that given to the image whose face size is large. On the other hand, in a case where when it is determined that the scene of the image is wedding, the setting is performed so that the image whose face size is large is given a score high compared to that given to the image whose face size is small.

At S909, a double-page spread layout is created. In the double-page spread layout creation at this step, based on the number of image slots set in the album creation parameter, images to be used are selected. At the time of this image selection, it may also be possible to divide the allocated image capturing date section into the number of sections corresponding to the number of images to be selected and to select an image for each divided section.

At S909, layout results using the selected images are created. Here, explanation is given by taking a case as an example when a fixed template with which it is possible to arrange the selected images the most appropriately is selected from among a plurality of fixed templates already created in advance and the layout results are created by arranging the images in the selected fixed template. For each number of images to be arranged, one or a plurality of fixed templates is created and, in the user terminal 100, variations of the fixed template are prepared in advance, in which the combination of aspect ratios of images, the amount of margin between images, the amount of margin of commodity material rim, the way photos overlap, and the like, are changed.

At S909, first, among the plurality of fixed templates prepared in advance, a fixed template with which it is possible to arrange the selected images is extracted. The fixed template that is extracted here is specifically a template whose number of images and aspect ratio are the same. In the extracted template, the images whose score is high are arranged in the slot in order from the slot whose size is the largest. The processing such as this is performed repeatedly the number of times corresponding to the number of extracted templates. As a result of that, candidate layouts are created so as to correspond to the number of extracted templates.

After that, one final layout is selected from among the created candidate layouts. To explain in detail, layout evaluation is performed for the one created candidate template or for each of the plurality of created candidate templates. The layout evaluation is performed based on the point of view of the amount of margin within the double-page spread, the size ratio between the maximum slot and the minimum slot, the trimming amount of the image, whether the main object is hidden by the slot of the upper layer, whether the main object overlaps a fold, and the like.

Further, the layout evaluation is performed based on the amount of margin included in the album creation parameter, the size ratio between the maximum slot and the minimum slot, and the like. The candidate layout whose evaluation value is the highest as a result of the layout evaluation is determined as the final layout. In a case when an item, such as a template number whose use frequency is high, is specified in the album creation parameter, it may also be possible to preferentially use the template specified by the information. Further, for example, in a case when an item of the connection tendency of successive templates is specified in the album creation parameter, it may also be possible to create the final layout after determining the template of each double-page spread based on the information. The item of the connection tendency of successive templates is an item indicating whether there is a tendency for a specific template to follow a certain template.

At S910, whether the layouts corresponding to all the double-page spreads are created is determined. In a case when the determination results at this step are affirmative, the automatic layout processing is terminated (that is, the processing advances to S906). On the other hand, in a case when the determination results at this step are negative, the processing returns to S906 and the automatic layout processing is continued until the layouts corresponding to all the double-page spreads are created.

<About General Flow of Learning Phase in Cloud Server>

In the following, the learning processing performed in the cloud server 110, specifically, the general flow of the phase of learning the album creation parameter based on album data that is transmitted to the cloud server 110 at the time of ordering is explained by using FIG. 10.

At S1001, the cloud server 110 having stood by receives the completion notification of the alum ordering processing, which is transmitted from the user terminal 100.

At S1002, the album data corresponding to the completion notification received at S1001 is acquired. In the album data acquired at this step, UserID for identifying a user who has created the album data (album creator) is included.

At S1003, based on the album data (layout data) acquired at S1002, the album feature value is calculated.

At S1004, the album feature value calculated at S1003 is saved in the HDD 115.

At S1005, whether or not to perform learning is determined. First, the album feature value of the album ordered in the past by the user of the UserID acquired at S1002 is acquired and the acquired feature value and the album feature value saved in the HDD 115 at S1004 are compared. In this comparison, the album feature value is regarded as being a vector and a correlation is taken in a round-robin manner so as to correspond to the number of albums ordered in the past. In a case when the calculated correlation value is greater than or equal to a predetermined threshold value, it is determined that there is a relationship and on the other hand, in a case when the calculated correlation value is less than the predetermined threshold value, it is determined that there is no relationship. In a case when there is at least one album feature value for which it is determined that there is a relationship, the possibility that the ordering is made again by making use of the album data ordered in the past again is high, and therefore, learning is not performed and the processing returns to S1001 and stands by. In contrast to this, in a case where there is no album feature value for which it is determined that there is a relationship, the processing advances to S1006 and the learning using the album feature value is performed.

At S1006, based on the UserID acquired at S1002, the album feature value of the learning-target UserID is read from the HDD 115. At this time, the number of acquired album feature values is counted. In the HDD 115, the past ordering data is stored. At this step, it may also be possible to select the album feature value used for the leaning based on the album ordering interval. For example, in a case when the ordering interval of a user who ordered an album is longer than or equal to three years, it is considered that the album feature value of the album ordered in the past is not used for the learning. Alternatively, in a case when an album is ordered the very most recently (that is, continuously by the same user), it may also be possible to use only the album feature value of the album ordered in the past three months for the learning. Further, it may also be possible not to use the data ordered again for the learning.

At S1007, whether to perform learning by using only the album feature value of a single user (that is, the user of the UserID acquired at S1002) is determined. In a case when the determination results at this step are affirmative, the processing advances to S1009, and, on the other hand, in a case when the determination results are negative, the processing advances to S1008. In this example, the determination based on the number of album feature values counted at S1006 is performed. Specifically, in a case when the number of album feature values is larger than or equal to a predetermined threshold value, it is determined that learning is performed by using only the album feature value of a single user and the processing advances to S1009. On the other hand, in a case when the number of album feature values is less than the predetermined threshold value, the processing advances to S1008.

At S1008, GroupID for identifying a group to which the user of the UserID acquired at S1002 belongs is acquired and all the album feature values associated with the acquired GroupID are read from the HDD 115. The GroupID is for managing the users whose preference is similar, including other users, for each group. In a case when it is determined that number of album feature values of a single user is insufficient at S1007, the learning is performed by adding the album feature values of other users. However, at that time, the album feature values of all the users, which are saved in the HDD 115, are not taken as the data to be added and the album feature values of the users in the same line are selected and made use of as the learning data. In the present embodiment, for the purpose of determining whether the album feature values are those of the users in the same line, the GroupID for identifying the group to which the user belongs is allocated to each album.

Figure 11:
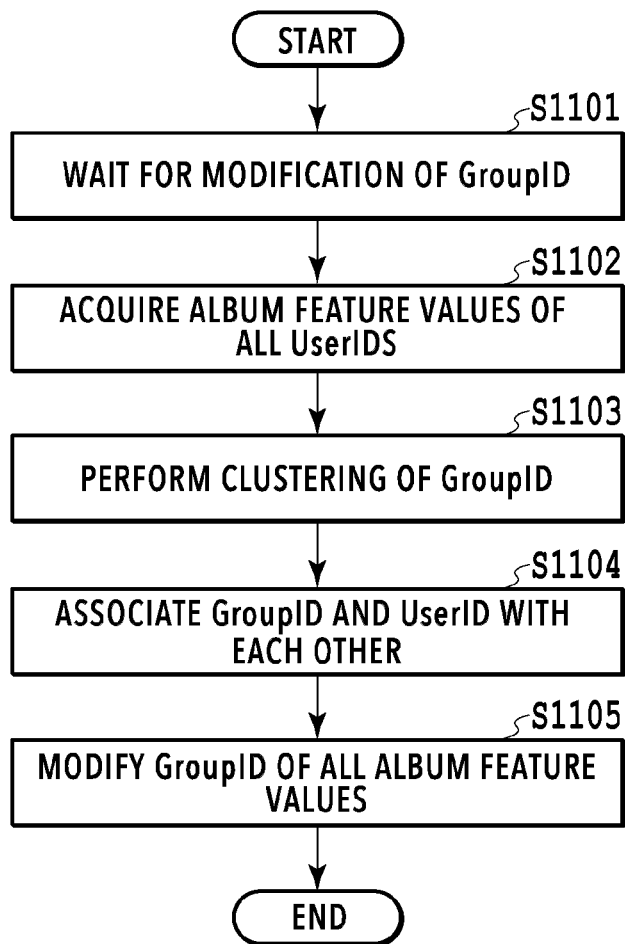
FIG. 11 is a flowchart of allocation processing of GroupID.

Here, the allocation of the GroupID, which is performed in the cloud server 110, is explained by using FIG. 11.

At S1101, the cloud server 110 in the state of waiting for modification of the GroupID receives the completion notification of the album ordering processing, which is transmitted from the user terminal 100.

At S1102, the album feature values of all the UserIDs, which are the feature values of all the albums, are read from the HDD 115.

At S1103, clustering of the GroupID is performed. The clustering is performed by plotting all the acquired album feature values in a multi-dimensional feature value space. To be more detail, the distance between two album feature values in the feature value space is calculated and in a case where the calculated distance is less than or equal to a predetermined threshold value, it is determined that the two albums is in the same class. For all the album feature values, the distances are calculated in a round-robin manner, and a class is allocated, which has, as its center, the album feature value whose number is the largest among the album feature values for which the albums are determined to be in the same class. The processing such as this is repeated until a belonging class is allocated to all the album feature values. As a result, each album feature value is allocated to one of the classes.

At S1104, the GroupID and the UserID are associated with each other. Based on the results of the clustering at S1103, the class allocated to each album feature value is allocated as the GroupID.

At S1105, modification of the GroupID is performed for all the album feature values. The reason the processing at this step is performed is that it is necessary to update the GroupID attached to the saved album feature value by taking into consideration the added album feature value because the album feature value is added by the ordering.

Here, the method of allocating the GroupID by clustering is described, but it may also be possible to allocate the UserID as the same class, for which the possibility that the preference is the same is high based on, such as an age group and sex, by using the user profile associated with the UserID. That is, it may also be possible to allocate the GroupID by making use of one other than the similar feature value. For the users whose user profile, such as sex and age, is similar, the possibility that the preference is the same is high, and therefore, the same GroupID is allocated. Further, in a case when images are managed in the cloud server 110, or the like, it may also be possible to allocate the same GroupID based on the kind of object included in the most recently uploaded image.

Further, it may also be possible to classify the album feature values into categories. For example, the album feature values are classified into categories based on the scene determined by the scene determination. Specifically, in a case when the album feature values are classified into three scenes, that is, wedding, journey, and others, it is recommended to classify the album feature values into three categories of the album feature value for wedding, the album feature value for journey, and the album feature value for others. The album creation parameters are also classified into a plurality of categories accordingly.

Figure 10:
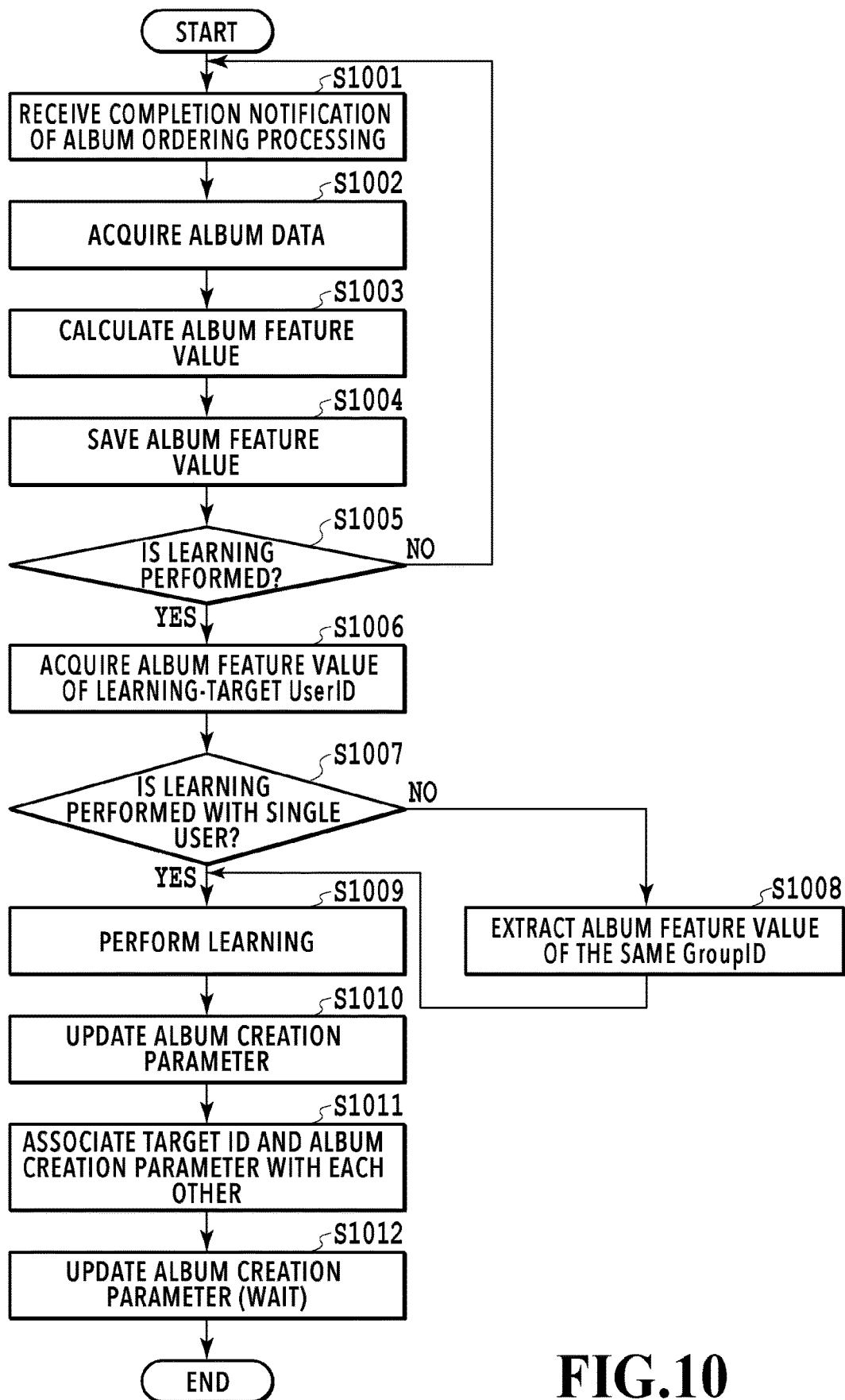
FIG. 10 is a flowchart of learning processing performed on a cloud server.

Explanation is returned to FIG. 10. At S1009, the learning is performed based on the album feature values acquired at S1006 and S1008. Details of the learning processing will be described later.

At S1010, the album creation parameter is updated. In detail, the album creation parameter is updated by the album creation parameter generated by an album creation parameter generation unit 1213 (see FIG. 12), to be described later.

At S1011, the ID for the album ordered this time and the album creation parameter are associated with each other.

In a case when the application is activated in the user terminal 100, at S1012, the cloud server 110 transmits the album creation parameter for which learning has been performed to the user terminal 100 (download of the album creation parameter for which learning has already been performed). In the user terminal 100, updating of the album creation parameter using the downloaded album creation parameter for which learning has already been performed is performed. Due to this, it is made possible to use the album creation parameter for which learning has already been performed in each module of the application, and, as a result, the setting of the updated parameter is reflected at the time of the automatic layout processing.

<About Learning for Finding Album Creation Parameter in Accordance with Preference of User>

In the following, as the learning method of the present embodiment, a method of generating an album creation parameter 1204 in accordance with the preference of a user based on a user album feature value 1206 is explained by using FIG. 12.

An image set 1201 is an image set used for learning. As an image to be included in the image set used for learning, it is possible to use an image published on a WEB, an image prepared by an album service provision company, and the like, not only an image captured by a user.

An image setting unit 1212 creates the image set 1201 by using an image saved in a usable image DB (in the this example, the HDD 115). In the present embodiment, as the image set 1201, two kinds of image set, that is, a learning image set and a verification image set are created.

In a case when the automatic layout processing is performed for the image set 1201 in an automatic layout processing unit 1210 by using the album creation parameter 1204, album data 1202 (layout data) is created. The album creation parameter 1204 is a parameter that is optimized by repeating learning. The album creation parameter generation unit 1213 generates the album creation parameter necessary at the time of performing the automatic layout processing in the automatic layout processing unit 1210. The automatic layout processing unit 1210 is a module that provides the automatic layout function described previously.

An album feature value acquisition unit 1211 derives (calculates) an album feature value 1203 based on the album data 1202 generated by the automatic layout processing unit 1210.

Figure 12:
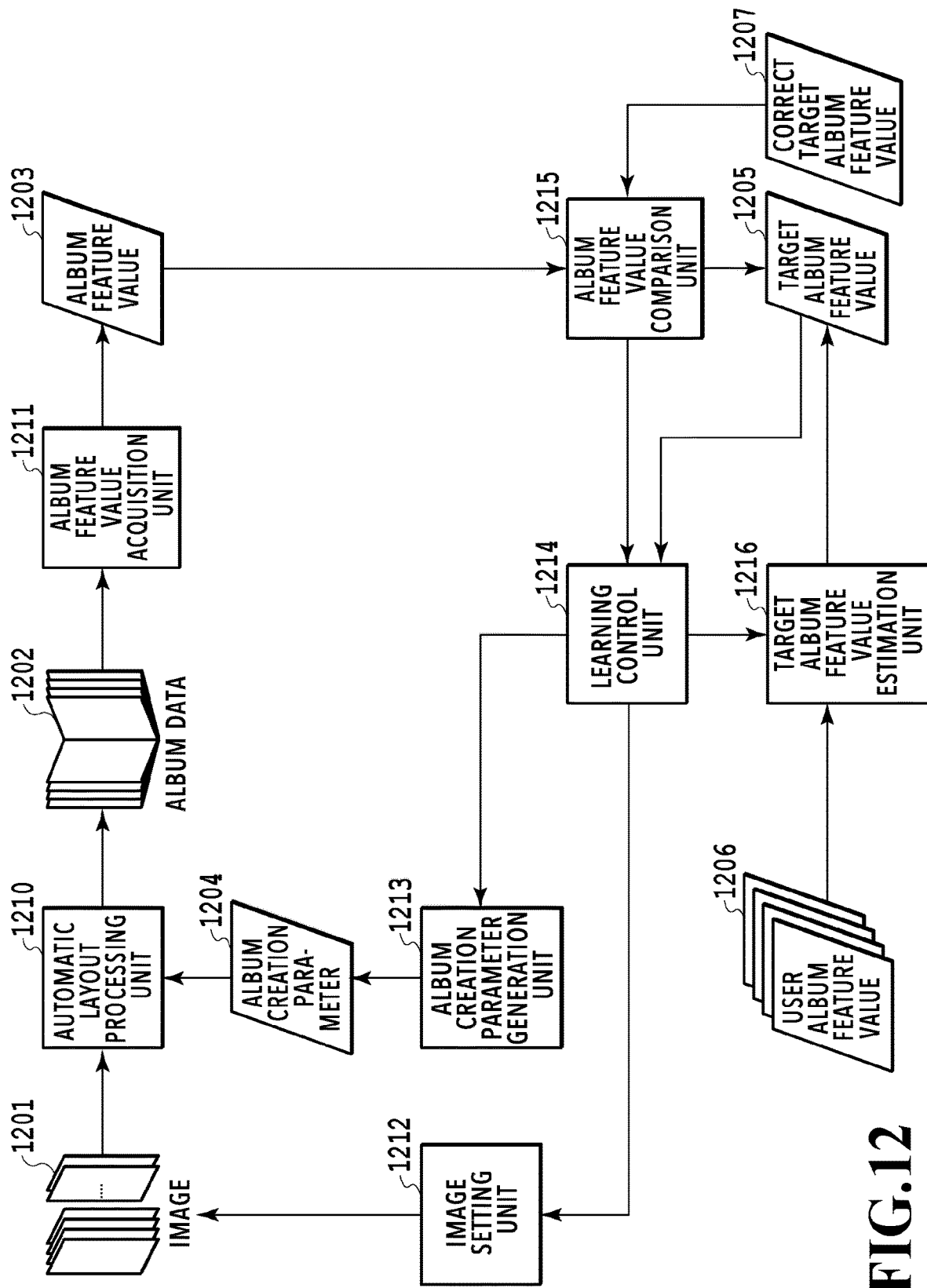
FIG. 12 is an explanatory diagram of learning.

In FIG. 12, the user album feature value 1206 is a feature value indicating the feature of the album created by a user. A target album feature value estimation unit 1216 estimates a target album feature value based on the user album feature value 1206. The target album feature value estimation unit 1216 also acquires a correct album feature value (referred to as correct target album feature value) 1207 of the target album from the user album feature value 1206. The processing of the target album feature value estimation unit 1216 will be described later by using FIG. 13.

A learning control unit 1214 controls learning work that is explained in the present embodiment. An album feature value comparison unit 1215 compares the album feature value 1203 and the correct target album feature value 1207. The comparison by the album feature value comparison unit 1215 and the estimation processing of the target album feature value by the target album feature value estimation unit 1216 are performed repeatedly (that is, learning is performed repeatedly). Due to this, it is possible to find a target album feature value 1205 putting the preference of a user together.

<About Estimation of Target Album Feature Value>

Figure 13:
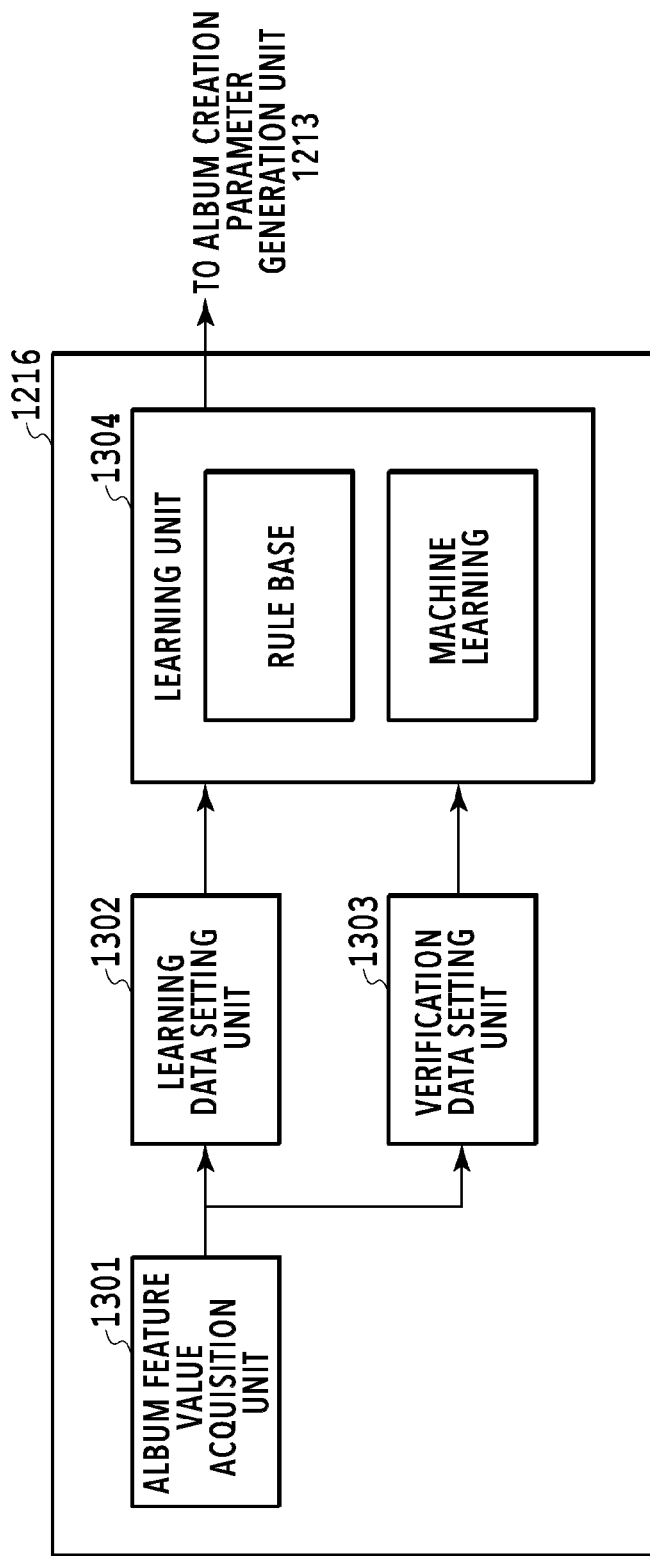
FIG. 13 is a detailed functional block diagram of a target album feature value estimation unit.

In the following, details of the target album feature value estimation unit 1216 in FIG. 12 are explained by using FIG. 13. FIG. 13 is a detailed functional block diagram of the target album feature value estimation unit 1216.

An album feature value acquisition unit 1301 derives an album feature value based on the album data. Here, the album feature value acquisition unit 1301 acquires the user album feature value 1206 and the correct target album feature value 1207. By the user album feature value 1206 being input to a learning unit 1304, such as DeepLearning, the target album feature value 1205 is output. The correct target album feature value 1207 is delivered to the album feature value comparison unit 1215 as it is. The user album feature value 1206 and the correct target album feature value 1207 are allocated for learning and for verification, respectively. The "verification" is a piece of processing in the learning phase and details will be explained by using FIG. 14.

A learning data setting unit 1302 allocates and sets the album feature value for learning, which is used at the time of learning, of the user album feature value 1206. The album feature values corresponding to the number, which is a predetermined percentage of the total number of acquired album feature values, are set as the learning data. At this time, in a case when the number of pieces of learning data is less than a predetermined number, the feature value in units of album double-page spreads is set as the learning data. On the other hand, in a case when the number of pieces of learning data is greater than or equal to the predetermined number, the feature value in units of albums is set as the learning data.

A verification data setting unit 1303 sets the album feature values except for those set as the learning data by the learning data setting unit 1302 among the album feature values acquired at S1006 as the verification data. At this time, in a case when the feature value in units of double-page spreads is set as the learning data in accordance with the number of pieces of learning data in the learning data setting unit 1302, as the verification data also, the feature value in units of double-page spreads is set. On the other hand, in a case when the feature value in units of albums is set as the learning data, as the verification data also, the feature value in units of albums is set.

The learning unit 1304 performs estimation processing to output the target album feature value 1205 by using the user album feature value 1206. It is possible for the learning unit 1304 to switch the learning method to be adopted in accordance with the number of pieces of learning data. In a case when the number of pieces of learning data is greater than or equal to a predetermined value, the learning by the machine learning is performed. Here, as the algorithm of the machine learning, DeepLearning is used. The DeepLearning configures a network in which the feature values whose number of dimensions is the same size as the number of dimensions of the album feature values are estimated. It may also be possible to perform learning that takes into consideration the time series by adding the date of the album ordering data. Further, it may also be possible to use the machine learning, such as SVM, in place of the DeepLearning.

On the other hand, in a case when the number of pieces of learning data is less than the predetermined value, the learning by a rule base is performed. It may also be possible to perform a main component analysis, such as an average and a mode, by using a statistical method. Alternatively, it may also be possible to select results whose distances are close in a feature value space by performing plotting in the feature value space.

As a result of performing the estimation processing by using the learning data, the target album feature value 1205 is estimated. To the target album feature value estimation unit 1216, the comparison results by the album feature value comparison unit 1215 are input from the learning control unit 1214, and, therefore, the estimation accuracy of the target album feature value 1205 is improved. This series of flow will be explained by using FIG. 14.

Here, for explanation, the method of learning the fixed album feature value is described, but the items of the learning-target album feature value may be variable. For example, in a case when the number of times of ordering is low, the number of pieces of learning data is small, and, therefore, it may also be possible to perform learning by reducing the number of learning items. In a case when the number of times of ordering increases and the number of pieces of learning data increases, it may also be possible to increase the number of learning items. That is, the number of learning items in a case when the number of pieces of learning data is large is set larger than the number of learning items in a case when the number of pieces of learning data is low. Further, in a case when the learning does not converge successfully, it may also be possible to reduce the number of learning items. In a case when the learning converges, it may also be possible to increase the number of learning items.

In a case when the album creation parameter for which learning has already been performed exists at the time of performing learning, it may also be possible to perform additional learning by setting the album creation parameter for which learning has already been performed as the initial value. In a case when the number of pieces of data to be used for learning is small, it may also be possible to increase the number of times of learning by changing the combination of the learning data and the verification data.

The learning control unit 1214 determines whether or not to terminate the learning (S1408 and S1414 in FIG. 14, to be described later). In a case when the correlation value calculated in the processing process in the learning unit 1304 is greater than or equal to a predetermined threshold value, it is preferable to determine to terminate the learning. In a case when the correlation value is less than the predetermined threshold value, the processing is continued. At this time, in a case when the correlation value is less than a predetermined value, it may also be possible to limit the updating of the album creation parameter, to be described later, from being performed.

<About Learning Processing>

In the following, the learning processing (see FIG. 12, FIG. 13) described previously is explained by using FIG. 14. The learning processing in FIG. 14 includes a learning loop and a verification loop.

In a case when the learning of the album creation parameter 1204 is started, at S1401, the learning control unit 1214 instructs the target album feature value estimation unit 1216 to perform estimation of the target album feature value 1205 and acquisition of the correct target album feature value 1207.

The target album feature value estimation unit 1216 having received the instructions calculates (estimates) the target album feature value 1205 based on the already-acquired user album feature value 1206. Here, by the album feature value of the learning data set in the learning data setting unit 1302 in FIG. 13 being input to the learning unit 1304, the target album feature value 1205 is estimated. The estimated target album feature value 1205 is delivered to the album creation parameter generation unit 1213 via the learning control unit 1214. For example, based on the user album feature value 1206 of the layout data on the first double-page spread of the album generated by a user and the user album feature value 1206 of the layout data on the second double-page spread, the target album feature value is estimated. The estimated target album feature value 1205 is output to the album creation parameter generation unit 1213 via the learning control unit 1214.

Further, the target album feature value estimation unit 1216 acquires the correct target album feature value 1207 based on the instructions from the learning control unit 1214 and delivers the acquired correct target album feature value 1207 to the album feature value comparison unit 1215. For example, the target album feature value estimation unit 1216 acquires the album feature value of the layout data on the third double-page spread of the album generated by a user as the correct target album feature value 1207 and delivers the correct target album feature value 1207 to the album feature value comparison unit 1215.

At S1402, the learning control unit 1214 instructs the album creation parameter generation unit 1213 to generate the album creation parameter 1204. Upon receipt of the instructions, the album creation parameter generation unit 1213 converts the target album feature value 1205 output from the target album feature value estimation unit 1216 into the album creation parameter 1204. For example, based on the target album feature value 1205 estimated based on the user album feature value 1206 of the first double-page spread and the second double-page spread, the album creation parameter 1204 is generated. At the time of performing learning for the first time, it may also be possible to use a predetermined parameter as the initial album creation parameter, or newly create a parameter obtained by randomly changing the parameter.

At S1403, the learning control unit 1214 instructs the image setting unit 1212 to set the image set 1201 for learning. In response to the instructions, the image setting unit 1212 inputs the image set 1201 for learning to the automatic layout processing unit 1210. For example, a plurality of images used in the layout data on the third double-page spread is input to the automatic layout processing unit 1210 as the image set 1201.

At S1404, the automatic layout processing unit 1210 creates the album data 1202 (layout data) by using the album creation parameter 1204 generated at S1402 and the image set 1201 for learning, which is set at S1403. For example, the album data 1202 is generated by using the album creation parameter 1204 based on the target album feature value 1205 estimated based on the first double-page spread and the second double-page spread, which is generated at S1402, and the images of the third double-page spread. In this case, the generated album data can also be said as the estimated album data on the third double-page spread (estimated layout data on the third double-page spread). The automatic layout processing is already explained, and therefore, explanation is omitted (see FIG. 9).

At S1405, the album feature value acquisition unit 1211 acquires the album feature value 1203 corresponding to the album data 1202 created at S1404. For example, the album feature value of the estimated album data on the third double-page spread is acquired. In this case, the acquired album feature value can also be said as the estimated album feature value of the third double-page spread.

At S1406, the album feature value comparison unit 1215 compares the correct target album feature value 1207 acquired at S1401 and the album feature value 1203 acquired at S1405. For example, the correct target album feature value 1207 of the third double-page spread, which is acquired at S1406, and the estimated album feature value of the third double-page spread are compared.

The information based on the comparison results is delivered to the album creation parameter generation unit 1213 via the learning control unit 1214. Then, based on the information based on the comparison results, the album creation parameter 1204 is updated so that the estimated album feature value 1203 becomes closer to the correct target album feature value 1207. The information based on the updating results of the album creation parameter 1204 is input to the target album feature value estimation unit 1216 via the learning control unit 1214. Then, the parameter (for example, the weighting parameter between each node of the neural network) in the learning unit 1304 of the target album feature value estimation unit 1216 is optimized.

The information based on the comparison results may be delivered directly to the target album feature value estimation unit 1216 via the learning control unit 1214. Then, the parameter (for example, the weighting parameter between each node of the neural network) in the learning unit 1304 of the target album feature value estimation unit 1216 may be optimized. In this case, the information based on the comparison results may not be input to the album creation parameter generation unit 1213. In a case when the estimation accuracy of the target album feature value 1205 is improved by the target album feature value estimation unit 1216, the album creation parameter generated from the target album feature value 1205 is optimized naturally.

As described above, by the learning due to the estimation by the target album feature value estimation unit 1216 and the comparison by the album feature value comparison unit 1215, the optimization of the album creation parameter and the improvement of the estimation accuracy of the target album feature value 1205 are implemented.

At S1407, the learning control unit 1214 determines whether the learning loop is performed a predetermined number of times. In a case when the determination results at this step are affirmative, the processing advances to S1408 and on the other hand, in a case when the determination results are negative, the processing returns to S1402. The predetermined number of times, which is adopted at this step, does not need to be a particularly determined value.

By the processing explained above, it is possible to perform learning so that the estimated album feature value 1203, which is obtained as a result of performing the automatic layout processing while updating the image set 1201 and the album creation parameter 1204, becomes closer to the correct target album feature value 1207.

At S1408, based on the comparison results between the correct target album feature value 1207 at that point in time and the estimated album feature value 1203, whether or not to complete the learning loop is determined. For example, whether or not the comparison results at S1406 indicate a predetermined correct percentage is determined. In a case when the correct target album feature value 1207 and the estimated album feature value 1203 are not the feature values close sufficiently (that is, in a case when the correct percentage is low), the processing returns to S1402 in order to continue the learning loop. On the other hand, in a case when the correct target album feature value 1207 and the album feature value 1203 are the feature values close sufficiently (that is, in a case when the correct percentage is high), the learning loop is terminated and the processing advances to S1409.

The flow so far is explained again by using a specific example. For example, it is assumed that there are user album feature values corresponding to three double-page spreads. The target album feature value 1205 is calculated by the learning unit 1304 using the first double-page spread and the second double-page spread among them. Based on the calculated target album feature value, the album creation parameter 1204 is generated by the album creation parameter generation unit 1213. Here, the image setting unit 1212 sets the images used on the third double-page spread that is not used among the three double-page spreads as the image set 1201. Then, the automatic layout processing unit 1210 performs the automatic layout processing for the set image set 1201 of the third double-page spread by using the generated album creation parameter. After that, the album feature value acquisition unit 1211 acquires the album feature value (estimated album feature value of the third double-page spread) corresponding to the created album data (estimated album data on the third double-page spread). This estimated album feature value is the estimated album feature value of the third double-page spread, which is created by using the album creation parameter estimated based on the first double-page spread and the second double-page spread. Then, the estimated album feature value and the correct target album feature value of the third double-page spread are compared by the album feature value comparison unit 1215. Due to this, it is possible to check the estimation accuracy of the target album feature value estimation unit 1216.

As described above, in a case when the number of pieces of learning data is small, the feature value in units of the album double-page spreads is set as the learning data and in a case when the number of pieces of learning data is large, the feature value in units of albums (units of photo books including a plurality of double-page spreads) is set as the learning data. For example, the album creation parameter is created based on the first album and the second album and the automatic layout is performed by using the created album creation parameter and the images used for the third album. Then, the estimated album feature value of the third estimated album data generated as a result of the layout and the third correct target album feature value are compared.

By reflecting the comparison results in the learning unit 1304 in FIG. 13, the estimation accuracy of the album creation parameter is improved. In a case when the estimation accuracy is low, it is possible to improve the estimation accuracy by performing estimation repeatedly while changing the setting of the learning. Due to this, the album creation parameter in which the preference of a user is reflected to a certain extent is generated. In order to verify whether the album creation parameter is really accurate, in the learning phase of the present embodiment, the verification flow is performed. In FIG. 14, the learning loop and the verification loop (verification flow) are described separately, but the verification loop is also one flow in the learning.

In the following, the verification loop in the learning phase is explained. At S1409, the learning control unit 1214 instructs the image setting unit 1212 to set the image set 1201 for verification, which is not used in the learning loop so far. For example, in a case when the first double-page spread to the eighth double-page spread are used in the learning loop, in the verification loop, the ninth and subsequent double-page spreads are used.

At S1410, the automatic layout processing unit 1210 creates the album data 1202 by using the album creation parameter 1204 generated by the learning loop and the image set 1201 for verification, which is set at S1409. For example, by using the album creation parameter 1204 generated by the learning loop and the images used on the ninth double-page spread, the album data is generated. This album data can also be said as the estimated album data on the ninth double-page spread, which is estimated by using the album creation parameter.

At S1411, the album feature value acquisition unit 1211 acquires the album feature value 1203 corresponding to the album data 1202. For example, the album feature value of the estimated album data on the ninth double-page spread (estimated album feature value of the ninth double-page spread) is acquired.

At S1412, the album feature value comparison unit 1215 compares the correct target album feature value 1207 and the estimated album feature value 1203 acquired at S1411. For example, the album feature value of the album data on the ninth double-page spread (correct target album feature value of the ninth double-page spread) created actually by a user and the estimated album feature value of the ninth double-page spread are compared. Due to this, it is possible to verify whether the generated album creation parameter is accurate by using the ninth double-page spread.

At S1413, the learning control unit 1214 determines whether the verification loop is performed a predetermined number of times. In a case when the determination results at this step are affirmative, the processing advances to S1414 and on the other hand, in a case when the determination results are negative, the processing returns to S1409. The predetermined number of times adopted at this step does not need to be a particularly determined value and may be less than the number of times of the learning loop.

By performing the verification loop at S1409 to S1412, the performance of the album creation parameter 1204 for which learning has been performed is verified. For example, in a case when the correct target album feature value of the ninth double-page spread and the estimated album feature value of the ninth double-page spread reach a predetermined correlation value, it is possible to determine that the preference of a user is reflected.

As described above, even in a case when the image set 1201 for verification is set, which is different from the image set 1201 for learning, on a condition that the album feature value 1203 is close to the target album feature value 1205, it is determined that the verification is completed at S1414 and the learning terminates. At the time of verification, the user album feature value that is set in the verification data setting unit 1303 in FIG. 13 (for example, the album feature value of the ninth or subsequent double-page spread) is used. This album feature value is not used at the time of learning.

By using the album feature value not used for the learning, it is possible to verify whether an album that reflects the preference of a user can be created by the generated album creation parameter. Specifically, layout results are generated in accordance with the images used on the double-page spread corresponding to the user album feature value for verification and the album creation parameter created by using the user album feature value for learning, and the estimated album feature value corresponding to the layout results is derived. By comparing this with the correct target album feature value for verification, it is possible to verify whether the preference of a user is reflected. That is, it is possible to determine whether the album creation parameter satisfies a predetermined condition. Then, in a case when this condition is satisfied, the album creation parameter becomes downloadable at the time of updating of the application.

In the verification loop also, as in the learning loop, in a case when the number of pieces of verification data is small, the feature value in units of album double-page spreads is set as the verification data, but, in a case when the number of pieces of verification data is large, the feature value in units of albums (in units of photo books) is set as the verification data.

In a case when the difference between the target album feature value 1205 and the album feature value 1203 does not become small after the verification, the processing advances to S1402 and the learning is performed again. By doing so, it is made possible to find the album creation parameter 1204 reflecting the preference of a user by learning.

Figure 14:
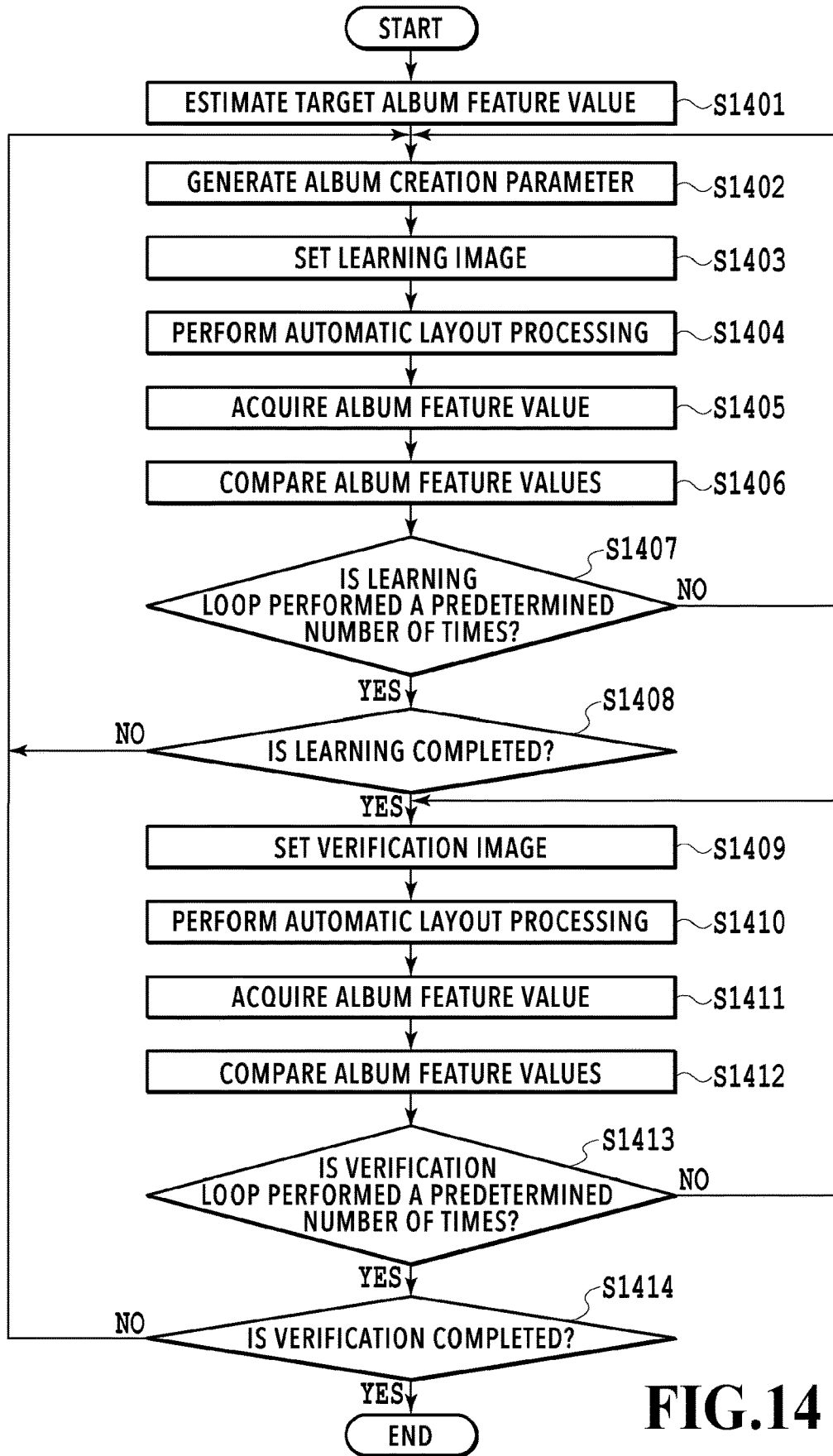
FIG. 14 is a flowchart of learning processing.

Although not shown in FIG. 14, in order to prepare for a case when it is not possible to create the desired album creation parameter 1204 even by performing the learning loop and the verification loop, it may also be possible to take steps to stop the learning and so on as needed by determining in advance the limit number of times of loop. Further, in a case when the learning does not converge, it may also be possible to perform learning under a different condition by changing the setting of the target album feature value estimation unit 1216 and so on.

<About Setting Method of Learning Data and Verification Data>

In the following, the setting method of learning data and verification data is explained by using FIG. 15A and FIG. 15B.

Figure 15A:
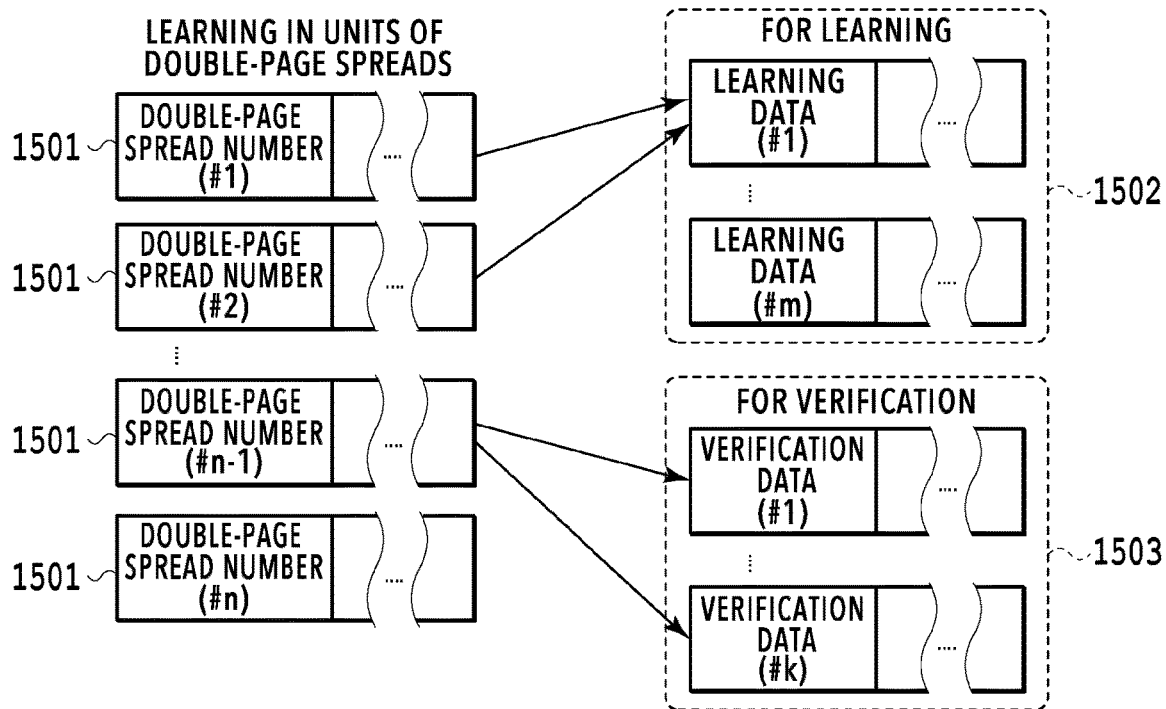
FIG. 15A and FIG. 15B are each an explanatory diagram of a setting method of learning data and verification data.

FIG. 15A shows the setting method of learning data and verification data in a case when learning is performed in units of double-page spreads. In a case when the number of pieces of data that can be made use of for leaning is insufficient, the learning is performed by making use of the data in units of double-page spreads. For example, in a case when the total number of pieces of the double-page spread layout data is n, m pieces of the data are allocated as learning data and k pieces of data are allocated as verification data (here, n=m+k).

Symbol 1501 indicates the feature value for each double-page spread number. In the feature value, within-double-page-spread information, which is included in album-specific information, is set (see FIG. 16B). In the example in FIG. 15A, it is assumed that there are n feature values corresponding to n double-page spreads.

Symbol 1502 indicates an allocated learning data group. Among the n double-page spread feature values, m double-page spread feature values are allocated for learning. The selection of the m double-page spread feature values may be random and, here, for explanation, by taking into consideration the page configuration of the album, the double-page spread feature values whose double-page spread numbers are #1 to #n−2 are set as the learning data.

Symbol 1503 indicates an allocated verification data group. Among the double-page spread feature values (total number is n), those (k double-page spread feature values) except for the (m) double-page spread feature values set as the learning data are set as the verification data. Here, for explanation, the double-page spread feature values whose double-page spread number is #n−1 to "#n are set as the verification data. It may also be possible to perform division into the learning data and the verification data for each slot size of the double-page spread.

Figure 15B:
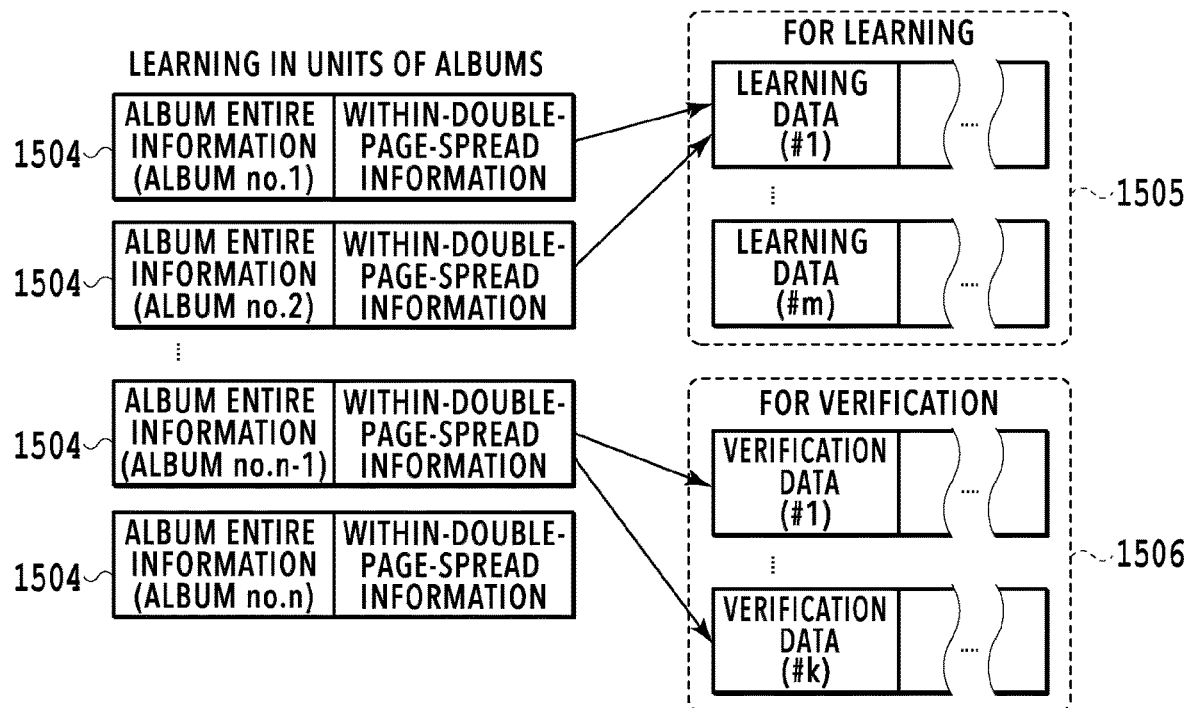

FIG. 15B shows the setting method of learning data and verification data in a case when the learning is performed in units of albums (in units of books including a plurality of spread pages). In a case when the number of pieces of album data is n, m pieces of album data are allocated as the learning album data and k pieces of album data are allocated as the verification album data (here, n=m+k).

Symbol 1504 indicates the feature value for each album number. In the feature value, album entire information on each album and within-double-page-spread information are set (see FIG. 16B). In the example in FIG. 15B, it is assumed that there are n feature values corresponding to n albums.

Symbol 1505 indicates an allocated learning album data group. Among the n album feature values, m album feature values are allocated for learning. Selection of the m album feature values may be random and here, for explanation, the album feature values whose album numbers are no. 1 to no. n−2 are set as the learning data.

Symbol 1506 indicates an allocated verification album data group. Among the album feature values (total number is n), those (k album feature values) except for the (m) album feature values set as the learning data are set as the verification data. Here, for explanation, the album feature values whose album numbers are no. n−1 to no. n are set as the verification data. It may also be possible to perform division into the learning data and the verification data for each scene determined at the time of analysis.

<About Album Creation Parameter>

In the following, the album creation parameter is explained by using FIG. 16A to FIG. 16C. FIG. 16A is a diagram showing the data structure of the album creation parameter. As shown in FIG. 16A, the album creation parameter includes User-specific information and album-specific information.

FIG. 16B is a diagram showing each configuration of the User-specific information and the album-specific information. GroupID is allocated for each user group putting together users whose preference is similar. As UserID, a specific ID is allocated for each user who ordered an album. Further, in the User-specific information, as other pieces of information, Sex, Age, Address, Telephone number, E-mail address, and the like, of a user who ordered an album are stored. The album-specific information includes album entire information and within-double-page-spread information.

FIG. 16C is a diagram showing each configuration of the album entire information and the within-double-page-spread information. In the following, the components (each item) of the album entire information are explained.

As AlbumID, a specific ID is allocated for each ordered album. In Commodity material size, the commodity material size of the ordered album is set. In Type of bookbinding, the type of bookbinding (full flat, perfect binding, and the like) of the ordered album is set. In Media, the media kind (glossy paper, semi-glossy paper, and the like) of the ordered album is set. In Number of double-page spreads, the number of pages of the ordered album is set. In Unit price, the price per ordered album is set. In Campaign, information relating to whether or not the album ordered by a user is a campaign-target product and information relating to the corresponding campaign are set. In Average margin amount, a value obtained by dividing the total margin area within each double-page spread by the number of double-page spreads is set. In Average number of image slots, a value obtained by dividing the number of images used for the album by the number of double-page spreads is set. In Average slot size ratio, a value obtained by dividing the total slot area within the album by the total number of slots is set. In Entire composition pattern, the pattern (Hinomaru (the national flag of Japan), tripartition, sandwich, and the like) of the composition of images used in the album is set. In Object weight, the ratio relating to the weight is set for the item relating to the object evaluation at the time of scoring and the item relating to the quality of image, such as hue and brightness. In Editing operation log, the contents that are laid out and edited in units of double-page spreads are set. The logs, such as the number of times of image replacement, the number of times of image trimming, the kind of correction performed, and the kind of effect performed, are stored. As the items in the album entire information, information relating to the entire album other than those described previously are stored.

In the following, the components (items) of the within-double-page-spread information are explained.

In Double-page spread number, the number of the double-page spreads within the ordered album is set. In Margin amount, the area of the margin within the double-page spread specified by Double-page spread number is set. Margin amount may be the width size of the double-page spread of the rim of the double-page spread or the width size between slots within the double-page spread. In Number of image slots, the number of image slots arranged on the double-page spread specified by Double-page spread number is set. In Slot size ratio, the ratio between the size of the maximum slot and the size of the minimum slot among the slots within the double-page spread specified by Double-page spread number is set. In Composition pattern, the composition pattern (Hinomaru (the national flag of Japan), tripartition, sandwich, and the like) of the images arranged on the double-page spread specified by Double-page spread number is stored. In Editing operation log, history information on editing performed in the layout editing (the number of times of image replacement, the number of trimmed slots, and the like) is set. Although not shown schematically, in the items in the within-double-page-spread information, information relating to the double-page spread other than those described previously is stored. For example, there are items as follows.

In Large slot object, the kind of object included in the image arranged in the large slot is set. In Effect, the kind of effect processing performed for the layout is set and, for example, the kind of effect, such as PhotoOnPhoto and gradation processing, is set. In Number of layers, the number of layers within the double-page spread is set. In Upper layer object, the object information included in the image arranged in the slot of the uppermost layer is stored. In Large slot composition, the composition information on the image arranged in the maximum slot is set. In Upper layer composition, the composition information on the image arranged in the uppermost layer is set. In Template number, the fixed template number used for the double-page spread is set. In a case when a user creates a template by editing or newly, a predetermined value is set. In Page straddle, whether or not the fold of the double-page spread is straddled is set. In Trimming amount, the trimming amount of each slot is set.

The same item may be included in the album entire information and the within-double-page-spread information. It may also be possible to change the priority of the same item depending on the learning data amount. For example, in a case when the learning data amount is small, priority is given to the learning of the item set in the album entire information. In a case when the learning data amount is large, priority is given to the learning of the item set in the within-double-page-spread information. It may also be possible to determine whether or not to add to the learning data in accordance with the campaign information within the album entire information.

<About Verification of Album Creation Parameter>

Figure 17:
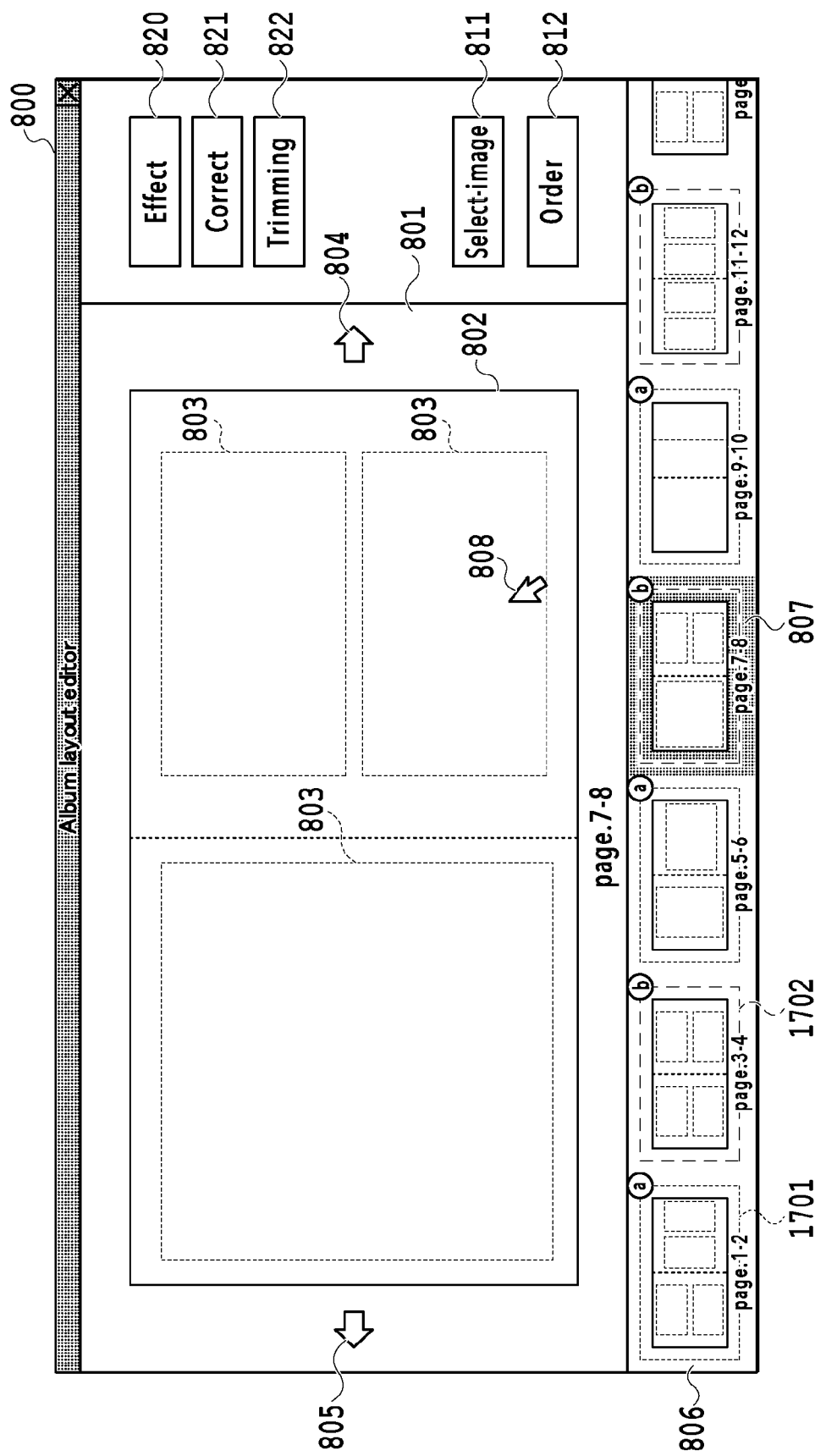
FIG. 17 is a diagram showing a verification example of an album creation parameter.

In the following, a method of verifying the album creation parameter set by learning in the user environment is explained by using FIG. 17. FIG. 17 shows a case when the album creation parameter is verified on the layout editing UI screen (see FIG. 8).

It is possible to exchange images, change the image size and so on, by performing the operation by using a mouse on the layout of the double-page spread currently being edited.

Symbol 1701 indicates the thumbnail of the layout of pages 1 and 2 in the album currently being edited. Here, "a" attached to this layout indicates the kind of album creation parameter at the time of creation of the thumbnail. Similarly, symbol 1702 indicates the thumbnail of the layout of pages 3 and 4 in the album currently being edited. Here, "b" attached to this thumbnail indicates the kind of album creation parameter (different from the album creation parameter of pages 1 and 2) at the time of creation of the layout. In the example in FIG. 17, the thumbnails of the layouts created by using the two kinds of album creation parameter are displayed alternately, but there may be three or more kinds of album creation parameter.

The automatic layout processing is performed with a plurality of album creation parameters and the layout results for each album creation parameter are acquired in advance. In a case when there is an ordering history, the kinds of album creation parameter may be two kinds of album creation parameter, that is, the album creation parameter for which learning has already been performed and the default album creation parameter. In a case when there is no ordering history, the kinds of album creation parameter may be two kinds of album creation parameter, that is, the default album creation parameter and the album creation parameter created in accordance with the results of analyzing the image at the time of creating the album. For example, in a case when it is made clear that there are many person images in the candidate images as a result of analyzing the images, the album creation parameter is set with which a person image is selected preferentially and arranged in the slot whose size is large. It may also be possible to randomly determine which album creation parameter to use for each double-page spread, or determine the album creation parameter in turn so that the order forms the shape of a loop.

As described above, by presenting the results of the automatic layout performed with a plurality of album creation parameters and acquiring the history of editing performed by a user for each of the layout results, it is possible to verify each album creation parameter. For example, in the case in FIG. 17, on a condition that the number of times of image replacement is smaller for the results of the layout generated with parameter "a" than that for the results of the layout generated with parameter "b, it is possible to determine that parameter "b" represents the preference of a user more accurately. Further, in a case when parameter "b" is the latest album creation parameter, it is possible to determine that the learning is in progress successfully.

At the time of album ordering, the history of editing by a user is also uploaded to the cloud server, and therefore, it is possible to select, classify and so on the learning data based on the history.

Other Embodiments

In the embodiment described previously, the method of performing learning by using the album feature value, but it may also be possible to design a network in which data obtained by putting together the images used for the album and the arrangement information is taken as an input and the album creation parameter is output.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is made possible to present a layout that reflects the preference of a user.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control method comprising:
    acquiring first layout data and second layout data generated by an album creation application in a terminal device of a user and uploaded to a server;
    outputting an estimated feature value based on the acquired first layout data;
    generating an album creation parameter based on the output estimated feature value;
    generating layout data based on the generated album creation parameter and an image used for the acquired second layout data; and
    updating the album creation parameter based on a feature value based on the generated layout data and a feature value based on the second layout data.

2. The control method according to claim 1, wherein, by images used for the second layout data being arranged in a template based on the generated album creation parameter, the layout data is generated.

3. The control method according to claim 1, wherein a number of items of the album creation parameter to be updated in a case when a number of pieces of layout data uploaded to the server is greater than a number of items of the album creation parameter to be updated in a case when a number of pieces of layout data uploaded to the server is small.

4. The control method according to claim 1, wherein, in a case when the updated album creation parameter satisfies a predetermined condition, the updated album creation parameter is downloaded to a terminal device of a user by updating of an album creation application.

5. The control method according to claim 4, wherein the downloaded updated album creation parameter is used at the time of generating new layout data by the album creation application.

6. A control method comprising:
    outputting an estimated feature value based on the first layout data generated by a user;
    generating an album creation parameter based on the output estimated feature value;
    generating layout data based on the generated album creation parameter and an image used for second layout data generated by a user; and
    updating the album creation parameter based on a feature value based on the generated layout data and a feature value based on the second layout data,
    wherein, by a first feature value based on the first layout data being input to a learning unit as input data, the estimated feature value is output from the learning unit.

7. The control method according to claim 6, wherein, based on comparison results between a feature value based on the generated layout data and a feature value based on the second layout data, the parameter of the learning unit is updated.

8. A control method of controlling a terminal device, the control method comprising:
    acquiring a plurality of pieces of image data;
    acquiring an album creation parameter generated by learning using layout data generated in the past by a user;
    generating layout data based on the plurality of pieces of image data and the album creation parameter;
    causing a display unit to display the generated layout data as layout results;
    receiving editing instructions from a user for the displayed layout results; and
    uploading layout data edited based on the editing instruction.

9. A server comprising:
    at least one processor configured to cause the server to perform operations including:
    (a) acquiring first layout data and second layout data generated by an album creation application in a terminal device of a user and uploaded to the server;
    (b) outputting an estimated feature value based on the acquired first layout data;

(c) generating an album creation parameter based on the output estimated feature value;
(d) generating layout data based on the generated album creation parameter and an image used for the acquired second layout data; and
(e) updating the album creation parameter based on a feature value based on the generated layout data and a feature value based on the second layout data.

10. A server comprising:
at least one processor configured to cause the server to perform operations including:
(a) outputting an estimated feature value based on first layout data generated by a user;
(b) generating an album creation parameter based on the output estimated feature value;
(c) generating layout data based on the generated album creation parameter and an image used for second layout data generated by a user; and
(d) updating the album creation parameter based on a feature value based on the generated layout data and a feature value based on the second layout data, wherein, by a first feature value based on the first layout data being input to a learning unit as input data, the estimated feature value is output from the learning unit.

11. A terminal device comprising:
at least one processor configured to cause the terminal device to perform operations including:
(a) acquiring a plurality of pieces of image data;
(b) acquiring an album creation parameter generated by learning using layout data generated in the past by a user; and
(c) generating layout data based on the plurality of pieces of image data and the album creation parameter
(d) causing a display unit to display the generated layout data as layout results;
(e) receiving editing instructions from a user for the displayed layout results; and
(f) uploading layout data edited based on the editing instructions.

* * * * *